United States Patent
Cole et al.

(10) Patent No.: US 11,552,868 B1
(45) Date of Patent: Jan. 10, 2023

(54) COLLECT AND FORWARD

(71) Applicant: Tripwire, Inc., Portland, OR (US)

(72) Inventors: Brian Cole, Portland, OR (US);
Patrick Campion, Portland, OR (US);
Paul Lamb, Portland, OR (US)

(73) Assignee: Tripwire, Inc., Portland, OR (US)

( * ) Notice: Subject to any disclaimer, the term of this patent is extended or adjusted under 35 U.S.C. 154(b) by 117 days.

(21) Appl. No.: 15/287,189

(22) Filed: Oct. 6, 2016

Related U.S. Application Data

(63) Continuation of application No. 15/224,102, filed on Jul. 29, 2016, now abandoned.

(60) Provisional application No. 62/267,741, filed on Dec. 15, 2015.

(51) Int. Cl.
*H04L 43/065* (2022.01)
*H04L 43/04* (2022.01)
*H04L 67/101* (2022.01)
*H04L 51/214* (2022.01)

(52) U.S. Cl.
CPC ............ *H04L 43/065* (2013.01); *H04L 43/04* (2013.01); *H04L 51/214* (2022.05); *H04L 67/101* (2013.01)

(58) Field of Classification Search
CPC ......... H04L 43/10; H04L 43/14; H04L 43/50; H04L 51/046; H04L 51/066; H04L 51/14; H04L 51/16; H04L 51/28; H04L 51/32; H04L 41/12; H04L 41/20; H04L 41/0213; H04L 41/0246; H04L 41/0843; H04L 43/06; H04L 67/16; H04L 51/214; H04L 43/065; H04L 43/04; H04L 67/101
See application file for complete search history.

(56) References Cited

U.S. PATENT DOCUMENTS

| | | | | |
|---|---|---|---|---|
| 7,984,452 | B2 * | 7/2011 | Chakravarty | G06F 11/3065 714/48 |
| 2006/0251114 | A1 * | 11/2006 | Nuggehalli | H04L 41/0213 370/466 |
| 2007/0112574 | A1 * | 5/2007 | Greene | H04W 12/00407 340/572.1 |
| 2008/0196043 | A1 * | 8/2008 | Feinleib | G06F 11/0712 719/319 |

(Continued)

OTHER PUBLICATIONS

Jin, "A guest-transparent file integrity monitoring method in virtualization environment" 2010, Elsevier, pp. 256-266 (Year: 2010).*

(Continued)

*Primary Examiner* — Glenton B Burgess
*Assistant Examiner* — Rachel J Hackenberg
(74) *Attorney, Agent, or Firm* — Fredrikson & Byron, P.A.

(57) ABSTRACT

Apparatus and methods are disclosed for processing messages from agents of a network environment including the use of collectors. Collectors can use configurable pipelines to improve processing of messages received from the agents. In one example of the disclosed technology, a number of networked agents are configured to gather data describing operational aspects of an agent's computing host. A collector is configured to receive reports from the agent and send the gathered data to one or more destination agent data consumers designated by augmentation information in the reports. In some examples, the collector transforms data using one or more stage selector rules.

21 Claims, 11 Drawing Sheets

(56) References Cited

U.S. PATENT DOCUMENTS

| | | | | |
|---|---|---|---|---|
| 2010/0145950 A1* | 6/2010 | Kim | ................... | G06F 11/0709 |
| | | | | 707/741 |
| 2012/0254313 A1* | 10/2012 | Fake | ................... | G06F 11/3072 |
| | | | | 709/204 |
| 2013/0179536 A1* | 7/2013 | Glover | .............. | G06F 17/30584 |
| | | | | 709/217 |
| 2013/0286947 A1* | 10/2013 | Lott | ........................ | H04L 45/74 |
| | | | | 370/328 |
| 2014/0040182 A1* | 2/2014 | Gilder | ............... | G06F 17/30578 |
| | | | | 707/602 |
| 2016/0337441 A1* | 11/2016 | Bloomquist | .......... | G06F 9/5061 |
| 2017/0093640 A1* | 3/2017 | Subramanian | .......... | H04L 41/12 |

OTHER PUBLICATIONS

Wu, "Virtual Machine Management Based on Agent Service", 2010, IEEE, pp. 199-204 (Year: 2010).*

* cited by examiner

COLLECT AND FORWARD

CROSS-REFERENCE TO RELATED APPLICATIONS

This is a continuation of U.S. application Ser. No. 15/224,102, filed Jul. 29, 2016, which application claims the benefit of U.S. Provisional Patent Application No. 62/267,741, entitled "COLLECT AND FORWARD," filed Dec. 15, 2015, which applications are incorporated herein by reference in their entirety.

SUMMARY

Apparatus and methods are disclosed for generating, sending, and receiving messages in a networked environment using autonomous (or semi-autonomous) agents. Techniques disclosed herein for sending and receiving messages with agents include flow control mechanisms that allow for spooling of collected data by the agents to improve reliability in the event of network delay and outages. In some examples of the disclosed technology, agent capabilities can be readily expanded through the use of on-demand agent plugins for facilitating data collection and which further allow separation of message capabilities from particular plugin identification. In some examples of the disclosed technology, message and agent identifiers are applied to increase data reliability and to allow re-transmission of lost messages upon request. One or more collectors can generate and send configuration templates to the agents to configure the agents for streamlined processing and transmission of data gathering techniques. For example, the agents can be configured to pre-select one or more destinations for gathered data, and to format the transmitted data in one or more formats suitable for consumption by the destination. This allows for reduced processing of received data by the collector prior to sending messages with the agent data to a number of agents. Configurable pipeline processes can be defined and executed by the collector for further data transformation and destination selection.

The disclosed agent platforms are designed to address one or more challenges presented in enterprise deployments of agents by, for example: reducing agent footprint, improving scalability, dealing with erratic computer networks, providing semi-autonomous; operation, and/or providing a self-correcting framework. In some examples, configurability is provided by exposing a public Representational State Transfer (REST)-based Application Programming Interface (API).

In some examples of the disclosed technology, one or more computer-readable storage media storing computer-readable instructions that when executed by a processor, cause the processor to perform any of the methods disclosed herein.

DETAILED DESCRIPTION

I. General Considerations

Figure 1:
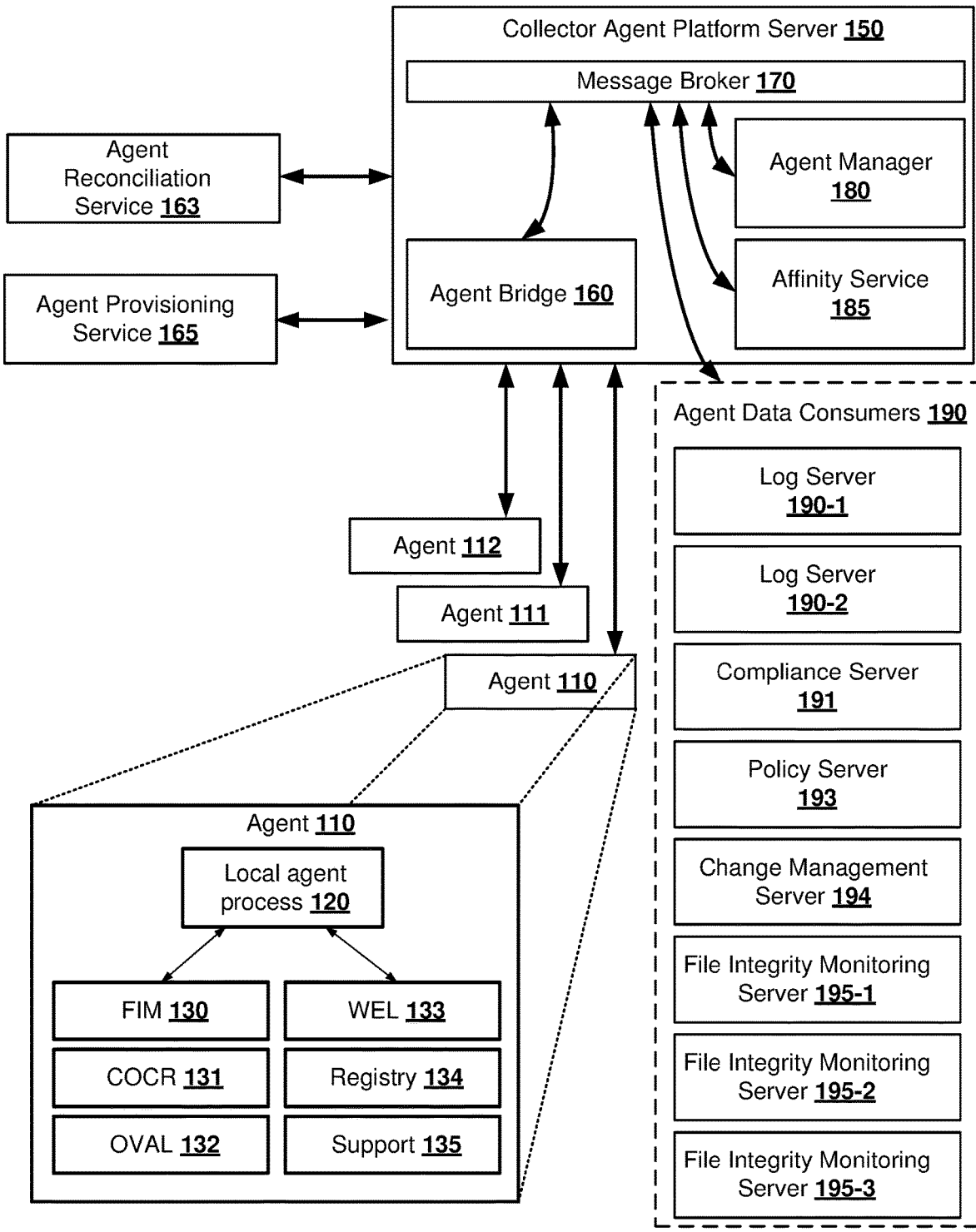
FIG. 1 illustrates an exemplary computing environment in which certain examples of the disclosed technology can be implemented.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "vulnerability," "weakness," "scan," and "perform" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Example Computing Network Environment

FIG. 1 illustrates an exemplary computing environment 100 in which some examples of the disclosed technology can be implemented. A number of agents 110, 111, and 112 are illustrated in FIG. 1. One of the agents 110 is further detailed as shown, and includes a local agent process 120 that can manage and communicate with a number of plugins 130-135 (e.g., a file integrity monitoring (FIM) plugin 130, a command output capture rule (COCR) plugin 131, an Open Vulnerability Assessment Language (OVAL) plugin 132, a Windows event log (WEL) plugin 133, a Registry plugin 134, and a support plugin 135) that are configured to extend the functionality of the agent. Further details and examples of agents are discussed further below. As will be readily understood to one of ordinary skill in the relevant art, the agent technology disclosed in this paragraph is not limited to the functionality of agent plugins 130-135, but can be adapted to specific deployments by adding other plugins or removing the depicted plugins.

Each of the agents 110-112 communicates with the rest of the system depicted in the computing environment 100 via a collector agent platform server 150. As shown, the collector agent platform server 150 includes an agent bridge 160 for sending messages to and from agents (e.g., agents 110-112). The agent bridge 160 can send messages over a computer network to agents executing on other computers, using inter-process and/or inter-thread communication to agents executing on the same computer as the communication bridge, or by using other suitable communication means.

An agent reconciliation service 163 can be used to match previous agent identifiers and operating system information with current identifiers and current operating system information. This reconciliation service ensures continuity in data and logging information stored in the agent data consumers 190.

An agent provisioning service 165 can be used that informs agents about their initial configuration information, configures the agents with specific combinations of plugins, or provides an upgrade of agent or plugin executable code. The agent provisioning service 165 can send discovery and configuration templates to the agents for execution and configuration of the respective receiving agent.

The illustrated collector agent platform server 150 also includes a message broker 170 with multiple message queues for temporarily storing messages received from and sent to, for example, the agent bridge 160, an agent manager 180, an affinity service 185, and agent data consumers 190. In some examples, the message broker 170 has a single message queue. The collector agent platform server 150 coordinates operation of the agents by sending and receiving messages using the message broker 170.

Some collector agent platform server implementations can contain more than one message broker 170 organized as a network of message brokers. Additionally, some implementations can include additional instances of the agent bridge 160 or the agent manager 180. Various combinations of message brokers, agent bridges, and agent managers can be used to support high-availability and redundant capabilities.

As shown in FIG. 1, the affinity service 185 resides as a component of the collector agent platform server 150 (e.g., as a standalone process executing on the collector agent platform server 150), while in other examples, the affinity service is hosted in an alternate location (e.g., as a thread or other component of the agent manager 180).

In some examples of the disclosed technology, for example, in large networks with multiple collector agent platform servers 150 and multiple agent data consumers 190, the affinity service 185 would be external to the collector agent platform server and centralized to improve communications with all instances of the collector agent platform server and destination agent data consumers.

The exemplary computing environment 100 includes a number of destination agent data consumers 190, including, but not limited to, multiple log servers (190-1 and 190-2), a compliance server 191, a policy server 193, a change management server 194, and multiple file integrity monitoring (FIM) servers (195-1, 195-2, and 195-3). In some examples the multiple log servers and/or the multiple FIM servers are hosted on separate virtual machines on the same physical hardware (e.g., a computing server). In some examples, the multiple log servers and/or the multiple FIM servers are hosted on separate physical machines in the same computer network environment. In some examples, multiple log servers and/or the multiple FIM servers are hosted on separate physical machines in different computing environments.

The affinity service 185 provides mappings to the message broker 170 and/or agent bridge 160 in order to direct message flow from the agents (e.g., agents 110-112) to one of the multiple log servers and/or multiple FIM servers. The affinity service 185 can utilize UUIDs in order to identify the agents 110-112 and destination agent data consumers 190.

In some examples, the affinity service 185 maintains a table representing the associations between agents (e.g. agents 110-112) and one or more of the destination agent data consumers 190). The agents can be assigned using a number of methodologies, including but not limited to assignments based on: round robin, load and/or capacity of one or more of the destination agent data consumers 190, geographic location of the agents and/or the destination agent data consumers, network topology (e.g., by physical subnets or virtual local area network (VLAN), function roles (e.g., a respective consumer and/or agent is deployed for product development, testing, staging, or production), version of an agent, and/or version of a destination agent data consumer.

In some examples, the affinity service 185 directs routing of messages from agents by intercepting an agent online message emitted by the agent manager 180. The agent online message is enhanced by providing the product server UUID assigned to the agent by the affinity service 185.

In some examples, the affinity service 185 maintains an affinity map that defines relationships between agents and destination agent data consumers. In some examples, the affinity service is configured to map each of the agents to a respective one of the data consumers. In some examples, the affinity service mapping is based at least in part on one or more of the following: a geographic location of one or more of the agents and/or the destination agent data consumers; topology of a network carrying communication between the destination agent data consumers, collector agent platform servers, and/or agent computing hosts; a functional role of one of the agents and/or one of the destination agent data consumers; a version of an agent; and/or a version of a destination agent data consumer.

Different combinations of destination agent data consumers 190 can be deployed in the environment 100 according to the desired compliance and security applications to be performed. These combinations are not limited to a single machine. The agent bridge 160, message broker 170, agent manager 180, or any combination of the destination agent data consumers can execute on separate computers, or separate virtual machines on a single or multiple computers. For example, the compliance server 191 can host a Compliance and Configuration Control (CCC) tool used to detect, analyze, and report on change activity in an IT infrastructure. The CCC tool can assess or receive configurations of the one or more nodes at one or more locations and determine whether the nodes comply with internal and external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The CCC tool can identify and validate changes to ensure these configurations remain in known and trusted states.

In particular implementations, the CCC tool operates by capturing a baseline of server file systems, desktop file system, directory servers, databases, virtual systems, middleware applications, and/or network device configurations in a known good state. Ongoing integrity checks then compare the current states against these baselines to detect changes. The CCC tool collects information used to reconcile changes detected by the agents 110-112, ensuring they are authorized and intended changes. The CCC tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the CCC tool to automatically recognize desired changes and expose undesired changes.

The CCC tool can also generate one or more reports concerning the monitored nodes showing a wide variety of information (e.g., compliance information, configuration information, usage information, etc.) The compliance-related reports generated by the CCC tool can, in some instances, comprise a score for a node that indicates the relative compliance status of the node as a numerical value in a range of possible values (e.g., a score of 1 to 100 or other such numeric or alphabetical range). The CCC tool can also apply a set of one or more tests to the nodes to evaluate the compliance status of one or more nodes. In such embodiments, the compliance-related reports generated by the CCC tool can include the number of devices that passed a particular test as well as the number of devices that failed the test. Further, the CCC tool can store detected change event data in an event log or transmit the event data as soon as it is detected or shortly after it is detected. Event logs typically comprise a list of activities and configuration changes at nodes of the IT network.

An exemplary CCC tool that is suitable for use with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT nodes using other compliance and configuration control tools as well.

The compliance server 191 can also include a security information and event management (STEM) tool that is used to centralize the storage and interpretation of events, logs, or compliance reports observed and generated in an IT management infrastructure. The event, log, and compliance report information is typically produced by other software running in the IT network. For example, CCC tools generate events that are typically kept in event logs or stored in compliance reports, as discussed above. The SIEM can be used to provide a consistent central interface that an IT administrator can use to more efficiently monitor and manage activity and configuration changes in an IT network. As needed, the IT administrator can access and use the CCC tool, which may provide deeper information than that provided by the SIEM. A SIEM tool can also integrate with external remediation, ticketing, and/or workflow tools to assist with the process of incident resolution. Furthermore, certain SIEMs include functionality for generating reports that help satisfy regulatory requirements (e.g., Sarbanes-Oxley, PCI-DSS, GLBA, or any other such requirement or standard such as any of those listed above). For these reasons, STEM tools are becoming more widely adopted by IT administrators who desire to use a single, centralized interface for monitoring and managing their increasingly complex IT infrastructures.

Logging tools can operate similarly to STEM tools. Accordingly, for any of the embodiments disclosed below, a logging tool may take the place of a STEM tool. For ease of readability, however, reference will typically be made to just a SIEM tool. An exemplary tool for logging and STEM that is suitable for use with the disclosed technology is the Tripwire® Log Center tool available from Tripwire, Inc.

III. Example Agent Implementation

Figure 2:
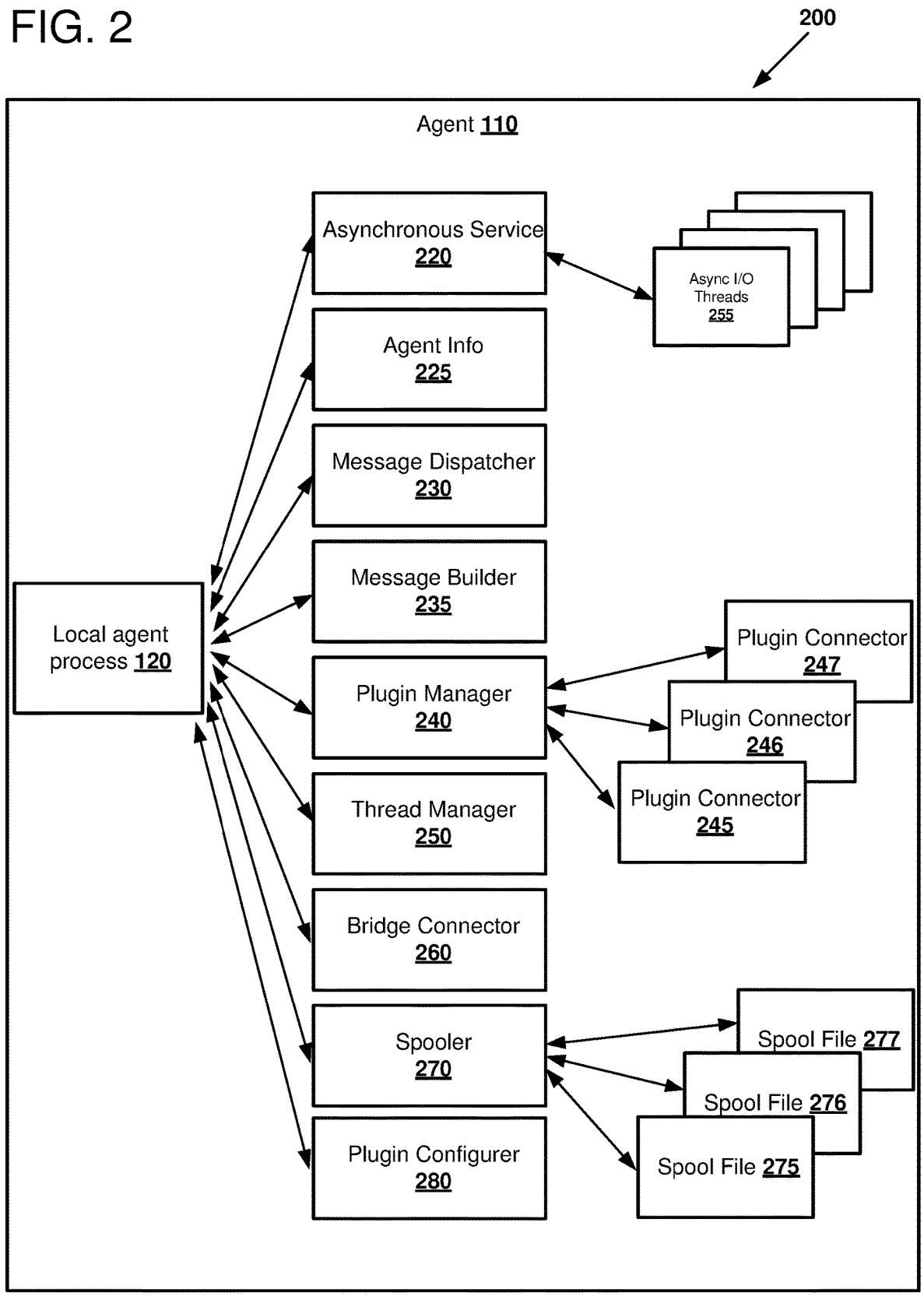
FIG. 2 is a block diagram illustrating an example agent, as can be used in certain examples of the disclosed technology.

FIG. 2 is a block diagram 200 further detailing the exemplary agent 110 introduced above regarding FIG. 1. As shown in FIG. 2, the agent 110 includes one or more local agent processes 120 that interact with a number of different components (e.g., components 220, 225, 230, 235, 240, 250, 260, 270, and 280) to perform various agent functionalities. It should be readily understood to one of ordinary skill in the art that other examples of agents can include or omit some of the components illustrated in FIG. 2.

In some examples of the disclosed technology, the agent 110 provides a common platform for executing pluggable platform and/or native code in a manner that does not require a concurrently active connection to either the agent bridge 160 or destination agent data consumers 190. By allowing unconnected operation, the agent 110 is better able to tolerate intermittent network connections, delays, and/or errors in the collector agent platform server 150, destination agent data consumers 190, or interconnecting networks.

The agent 110 includes functionality for automatically adjusting the rate at which data on the host system is acquired based on, for example, currently-available host system resources including cache resources, host system workload, or other host system resources. In some examples, cached data can be resequenced based on priority changes and observed behavior of the host system. In some examples, the agent can automatically adjust and prioritize transmission of cached data to the agent bridge 160, based on, for example, the amount of time the agent has been connected to the network, a network reconnection event, and/or using a pseudorandom number to determine when to send cached data to the agent bridge. In some examples, the adjusted rate is based on the amount of lag between messages in a spool (e.g., spooler lag can be defined by an agent as the amount of time between the oldest and newest unsent messages in a spool). In some examples, certain messages can be prioritized over others (e.g., messages carrying Security Content Automation Protocol (SCAP) data can be prioritized so that they are sent with higher priority than other types of messages).

In some examples of the disclosed technology, the agent 110 is implemented in a microkernel-based operating system platform, while in other examples, the agent is implemented using a more traditional monolithic kernel. The agent can include an embedded scheduler (e.g., executed by the local agent process 120 or another process) that determines when to execute agent tasks, even when the agent is not connected to a bridge or server.

In some examples, the agent 110 is a container-based agent that implements Federal Information Processing Standard (FIPS) cryptographic services for communicating and/or storing data. In some examples, information regarding FIPS containers, names, or other relevant FIPS fields are removed from data (e.g., before transmitting or storing FIPS data) to increase the difficulty of unauthorized decryption of FIPS communications and stored data.

In some examples, the agent 110 includes autonomous configuration capabilities. For example, the agent 110 can determine software versions and installed hardware associated with its host system or with installed plugins and based on the determined software and hardware, negotiate a more detailed configuration with any of the destination agent data consumers 190.

In some examples, the agent 110 includes support for on-demand push down of plugin modules. In some examples, the agent 110 includes the capability to automatically switch to different pre-designated endpoints by automatically switching to particular ports and/or bridges.

In some examples, the compliance server 191 communicates a desired spool depth to agents, which in turn adjust the rate at which data is sent to server. In some examples, when a spool associated with an agent becomes completely full, the agent can insert a mark in the spool and then, once space in the spool becomes available, peel off logs when data transmission resumes.

As shown in FIG. 2, the agent 110 includes an asynchronous service module 220 for controlling and coordinating asynchronous services, for example, processing of asynchronous messages received from and sent to the agent bridge. The asynchronous service module 220 can employ a number of asynchronous input/output (I/O) threads 255 for performing these tasks.

An agent information module 225 is used to send messages with information about the agent and its associated plugins, including identification information (e.g., one or more UUIDs), catalogs of available messages the agent is capable of consuming or producing, and other agent information.

A message dispatcher 230 sends messages between an agent bridge (e.g., via a bridge connector) and agent plugins. In some examples, the message dispatcher 230 can send commands to an agent spooler. A message builder 235 is used to build messages sent by the message dispatcher, including envelopes for such messages.

A plugin manager 240 including a number of plugin connectors 245-247 for connecting the agent to its plugins. A thread manager 250 is used to manage agent threads (e.g., bridge writer threads, plugin manager threads, asynchronous I/O threads, or other agent threads).

A bridge connector 260 is used to connect to one or more agent bridges and send messages from, for example, the message builder.

A multi-file spooler 270 includes multiple spool files 275-277 that can store data from the plugin manager before the data is sent to, for example, one or more of the agent bridges.

A plugin configurer 280 can be used to configure an agent plugins according to a received configuration template. The configuration template describes data to be gathered by the agent, frequency with which to gather the data, and formats to be used for generating augmentation and tag data generated by the plugin for sending to a collector.

In some examples of the disclosed technology, agents are designed to provide multi-platform functionality, thus allowing developers to develop agents for, e.g., both Windows and Posix platforms concurrently.

In some examples, agents and their corresponding plugins are written in C++ using multi-platform libraries and coding methodologies. In some examples, using languages such as C++ allows for a smaller agent memory footprint than agents implemented using other languages, e.g., Java.

In some examples, one or more agents (e.g., agents 110-112), agent bridges (e.g., agent bridge 160), and/or destination agent data consumers 190 (e.g., compliance server 191) can be co-located on the same computer system. In other examples, each of the agents, agent bridges, and compliance servers are installed on separate computing systems that are connected using a network or other communication means, or are installed within separate virtual machines connected on a single computing system.

In some examples of the disclosed technology, the agent is executed as a non-root/non-administrator user. This provides additional security by restricting access, but in some deployments, it may be desirable to allow limited administrator access to the agent and/or a subset of agent plugins to, for example, allow access to administrator resources (e.g., to access the Windows Event Log (WEL)).

The agents can communicate to the bridge using, for example, a proxy provided that supports the SOCKS5 protocol, although other protocols can be employed. In some examples, it is desirable to utilize authentication features provided by the network protocol to limit access to, for example, the bridge and/or compliance server to authenticated agents. In some examples, the SOCKS5 proxy used can be previously installed by a system administrator, and be used to support other communications unrelated to agent traffic. One desirable aspect of not including a proxy server within an agent is that the attack surface of the agent is reduced, as there is no open SOCKS5 port for attackers to attempt to attack.

In some examples, the spooler 270 is supplemented by a parallel Last-In First-Out buffer (LIFO) for certain types of messages. For example, because consumers of SCAP information often prioritize the most recent data available over older data, the agent can use a LIFO as a second spool for data coming from, e.g., an OVAL plugin, such that the newest messages are transmitted to the server first.

IV. Example Data Collection and Transmission System

Figure 3:
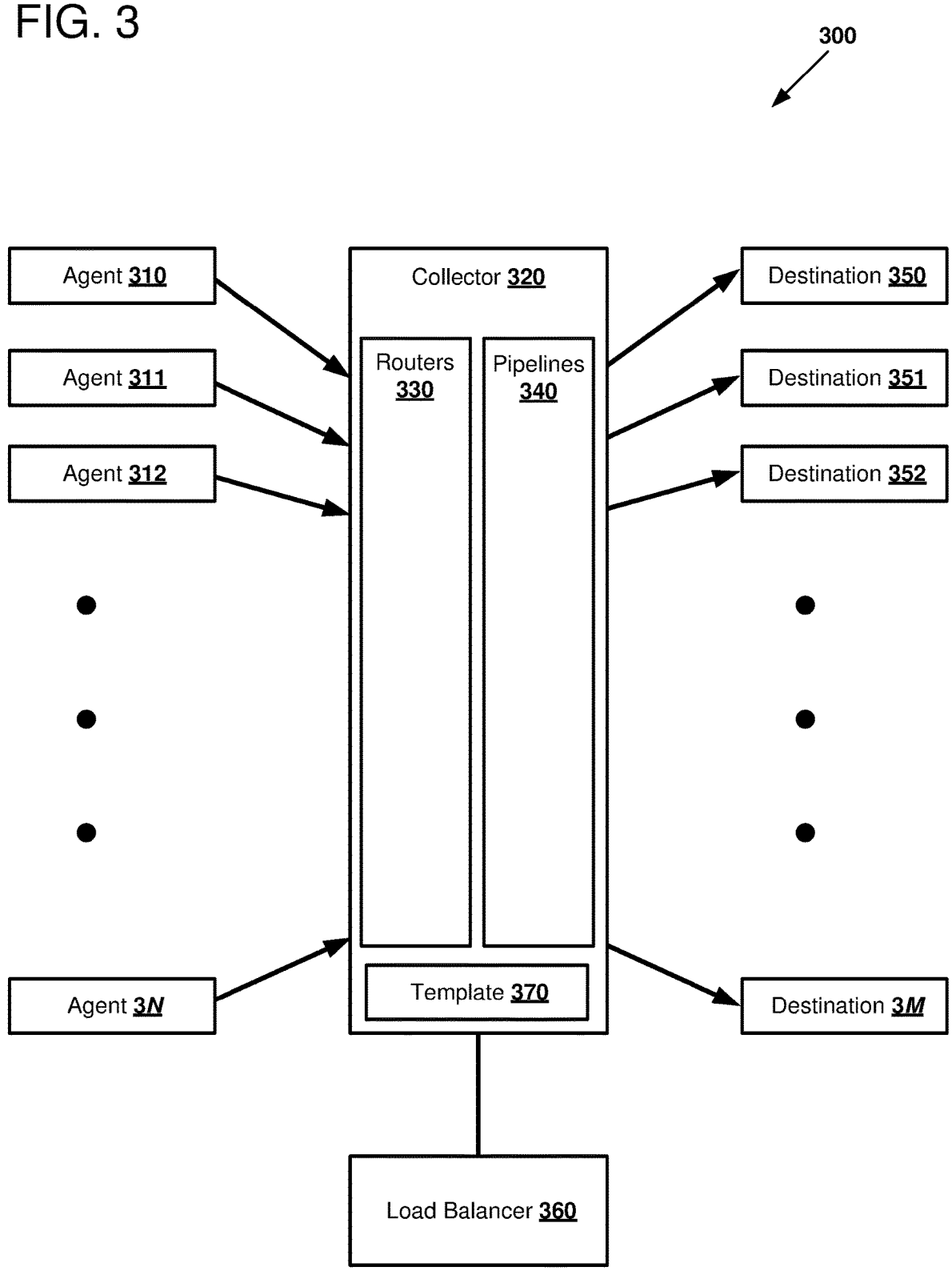
FIG. 3 depicts an example system including a collector, as can be used in certain examples of the disclosed technology.

FIG. 3 depicts an example system 300 in which a plurality of computing agents can send data to a collector, which in turn sends the data to a plurality of destinations. In some examples, the agent framework discussed above regarding FIG. 1 including details disclosed for the agent 110 further detailed in FIG. 2 can be employed, although as will be readily understood to one of ordinary skill in the relevant art, other suitable platforms can be used.

As shown in FIG. 3, a plurality of agents 310, 311, 312, etc. are configured to gather data describing operational aspects of their respective computing hosts and send the data to collector 320. The collector can be implemented using one or more computing devices and associated network devices. The depicted collector 320 includes a number of routers 330 that receive data from the agents and send the data to an appropriate one of the pipelines 340. The pipeline 340 enhanced the received data by applying stage selector rules to the received data and sending the resulting enhanced data to one or more destination agent data consumers, for example destinations 350, 351, and/or 352. The stage selector rules can include rules for sending data to a destination indicated by stage selector rule or sending data to a destination indicated by an affinity service. In some examples, the stage selector rules include rules for transforming the data prior to sending the data to one or more of the destinations. Also shown in FIG. 3 is a load balancer 360 which operates to monitor network traffic and loads and can be used to provide signals that are used by the collector 320 to select an appropriate one or more of the destinations depending on current network conditions. In some examples, the collector 320 is further configured to receive log data from network devices (e.g., routers, firewalls, switches, etc.) that do not have agents executing on them, through the use of a log provisioning service provided by the network device.

The collector 320 can be further configured to initiate discover services by sending discovery requests to one or more of the agents to gather data regarding resources and plug-ins available on each respective agent. The discovery script is executed by respective one of the agents and can send a report back to the collector or can configure the agent itself. For example, discovery script can cause the agent to be configured to augment data that it collects to allow for routing by the collector. For example, the augmented data can allow the collector to forward data to one of the destinations using a stateless protocol, thereby reducing the amount of computation performed by the collector in order to determine a destination. The destination agent data consumers can include relational databases, non-relational databases, map-reduce computing clusters (e.g., Hadoop), or resilient distributed dataset clusters (e.g., Apache Spark). Examples of some methods that can be performed in conjunction with the pipelines 340 are discussed in further detail at FIG. 6 below.

In some examples, the collector 320 is configured using a programmable template 370. The template 370 provides a way to create rules, and logic for implementing such rules in a programmable fashion, allowing for improved flexibility and collector performance. In some examples, the template 370 includes rules based on at least one or more types of information about the host machine, including: operating system, operating system version, hypervisor, hypervisor version, system patches, programs installed, and/or other information. The rules can configure the behavior of the routers 330 and/or pipeline 340 to direct messages from the agents according to the types of information. In some examples, data messages from the agent include an indication of the host machine information. In other examples, the collector 320 discovers such information about the host machines and associates this information with agents and/or their associated plugins. Messages received from the agents are then cross-referenced to determine which rules to apply to configure the routers 330 and/or pipelines 340.

In some examples, the template rules include rules based on assigned information for agents themselves. For examples, certain agents can be tagged at deployment to associate the agent with certain groups of agents. The rules are used to configure the routers 330 and/or pipelines 340 to direct messages based on tags associated with the agent. Examples of types of data agents can be tagged include associated owners of the agent, associate collectors, load balancing, allocated resources, and other suitable types. In examples, the agent tags can be used to scale the destination set for agent message traffic. In some examples, data associated with a particular tag can be distributed to a plurality of two or more destinations. In some examples, data associated with a particular tag is distributed to a particular destination, in a one-to-one mapping. In some examples, messages are assigned to destination sets based on the type of data being carried by the agent message.

V. Example Processing Pipeline

Figure 4:
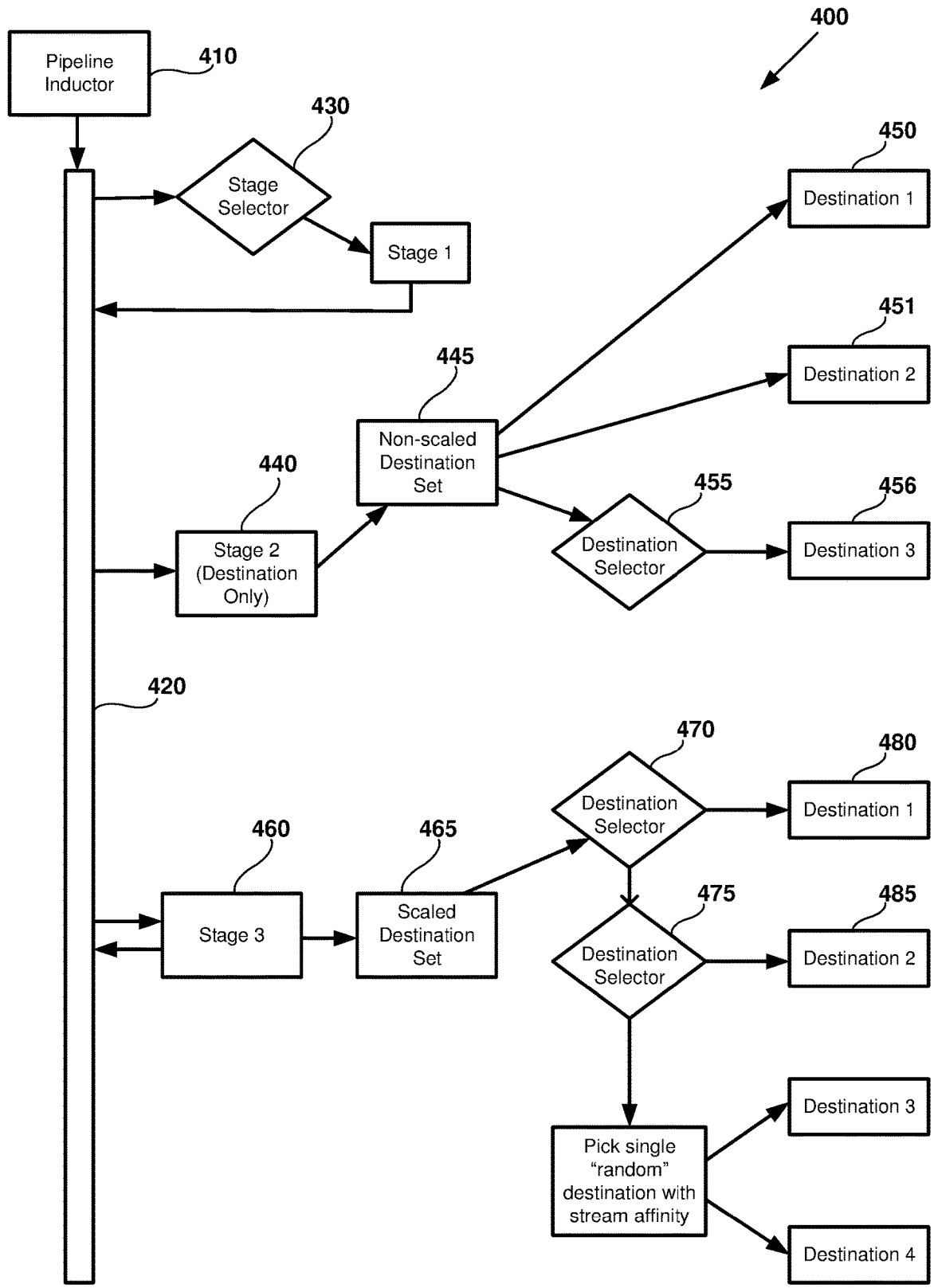
FIG. 4 is a diagram outlining an example of processing steps for enhancing data with a collector, as can be used in certain examples of the disclosed technology.

FIG. 4 is a diagram 400 outlining an example of processing steps for enhancing received data by a collector by applying stage collector rules to the received data prior to sending the data to one or more destinations (for example, a file, file server location, web application address, or agent data consumer).

As shown in FIG. 4, a pipeline inductor 410 receives data and inserts it into the processing pipeline 420. The processing pipeline can be implemented using suitable computing hardware for implementing disclosed examples of collect and forward (CnF) hardware described herein. The pipeline 420 sends the received data to a first stage selector 430 which is configured according to a stage selector rule that is applied to transform the received data and then re-inject the received data back into the pipeline 420. The transformed data is then sent to a second stage 440 where a non-scaled destination set of rules 445 is applied. In some examples, all of the data for a particular non-scaled destination is sent to a fixed one of the destinations, for example, destination 450 or 451. In some examples, a destination selector 455 is used in order to select a destination 456. It should be noted that the received data can be sent to one or more of the destinations. In some examples, augmentation data received with the data is used to select the destination or provide formatting rules for transforming the data prior to sending to the respective destination. The transformed data can also be sent to a third stage 460 which applies processing rules and re-injects the transformed data back into the pipeline 420. A portion of the received data, dubbed the scaled destination set 465, is also sent to a destination selector. If criteria associated with each of the destination selectors 470 or 475 are satisfied, then the data is sent to a corresponding destination, for example destination 480 or 485, respectively. If none of the destinations are satisfied then a single destination is selected using stream affinity. For example a single random destination can be selected based on a round robin or random fashion or based on feedback indicating a current loading of each of a number of destinations. Thus, by providing horizontal scaling of data received from a large number of agents, reduced latency and high bandwidth transactions can be supported.

VI. Example Method of Enhancing Received Data

Figure 5:
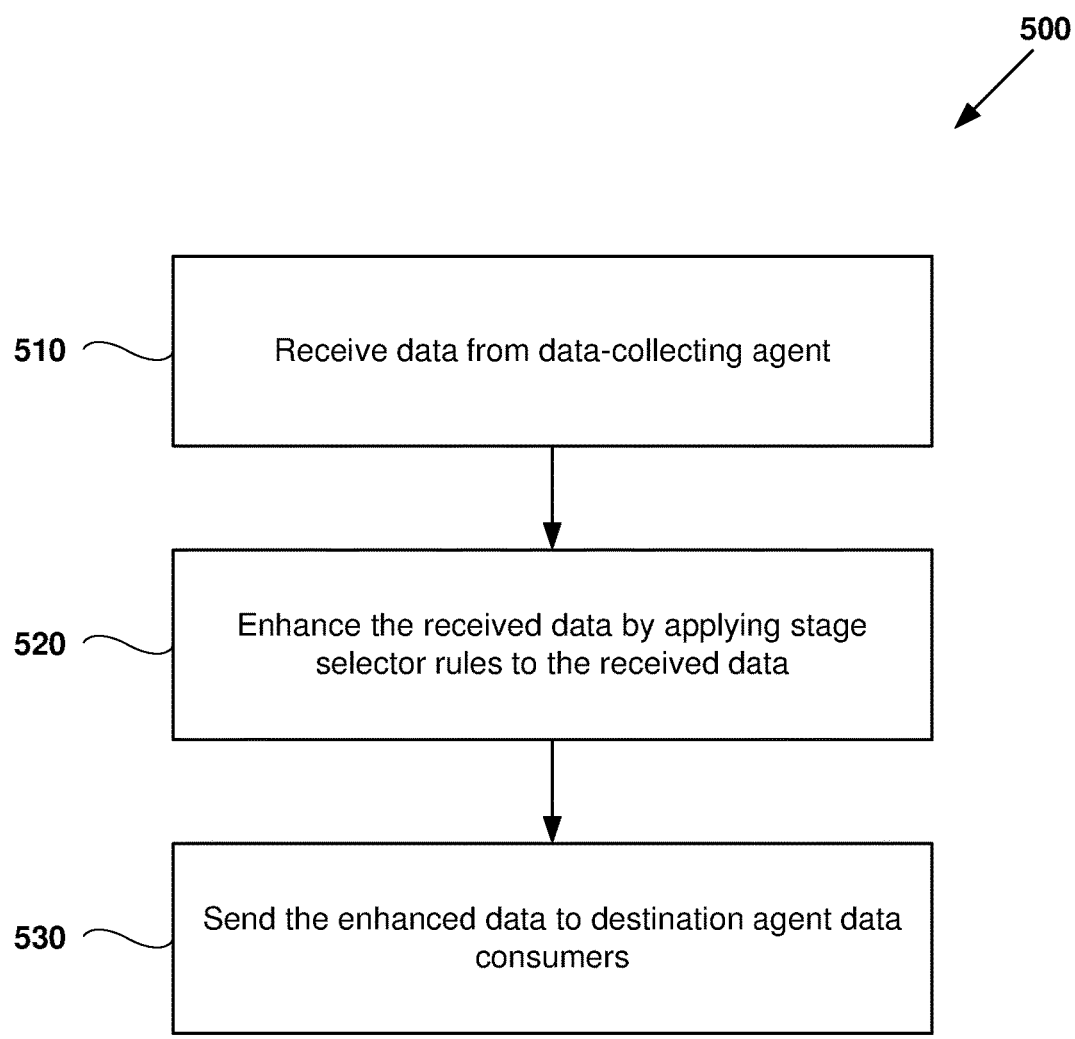
FIG. 5 is a flow chart outlining an example method of enhancing data with a pipeline process, as can be performed using certain examples of the disclosed technology.

FIG. 5 is a flow chart 500 that outlines an example method of enhancing received data using a pipeline process as can be performed using the disclosed technology. For example, the collector agent platform server and other associated collector components described above regarding FIGS. 1-3, can be used to perform the illustrated method.

At process block 510, a collector receives data from one or more data collecting agents that have been configured to send suitable data for sending to one or more destinations.

At process block 520, the received data is enhanced by applying stage collector rules to the received data. In some examples, the enhancing includes filtering at least a portion of the received data. In some examples, the enhanced data produced by process block 520 will include a subset of the received data defined, at least in part, on stage selector rules. In some examples, the enhancing includes modifying the received data into a different format selected based on an associated one or more destination agent data consumers. In some examples, the stage collector rules are expressed in a java script object notation (JSON) format. In some examples, the data is enhanced according to tag information in the received data.

At process block 530, the enhanced data generated at process block 520 is sent to one or more destinations, which can include files, file server locations, web or other network addresses, or destination agent data consumers. In some examples, one or more of the selected destinations are selected based on stage selector rules that were processed at process block 520. In some examples, sending the enhanced data includes, based on the applied one or more stage selector rules: if a destination is selected by an applied stage selector rule, the sending the enhanced data to a destination indicated by the stage selector rule; and if a destination is not selected by the applied stage selector rule, then sending the enhanced data to a destination indicated by an affinity service. The affinity service can base the destination selection on, for example, network traffic conditions, destination loading, or using allocation techniques such as random selection or round robin selection. In some examples, the enhanced data is further enhanced by applying an additional one or more stage selector rules to the received data. In some examples, the stage selector rules can be user generated.

VII. Processing Pipeline

Certain examples of the disclosed computing platforms include a data transformation utility named the "Processing Pipeline." One goal of the pipeline is to allow data transformations to be described as a sequence of "stages" for which the set of included stages and their order is defined entirely through configuration. Additionally the processing pipeline assumes that the processed data may have multiple consumers, potentially with different processing requirements or interest in different subsets of the processed data.

A. Example Data Processed by a Pipeline

The pipeline base classes are all written using type parametric polymorphism, so a pipeline could be developed that can process any type of data. For example, the pipeline processes "LogMessages" is a protobuf message defined in certain examples of the collector framework representing a set of events sent from a single asset (e.g., LogMessage-IDL).

B. Pipeline Stages

A pipeline stage provides a transformation of the pipeline data. Typically a stage calculates some useful addition to the data. A stage is defined as an extension of the following abstract class:

public abstract class PipelineStage<T> where T is the type the pipeline processes. Every stage can override the abstract method public abstract T ProcessStageImpl (T data)

Simply put, a stage's ProcessStageImpl method takes an instance of the pipeline's type and returns a new instance of this type, presumably the same data but enhanced in some way. The changes to the data are only visible by inspecting the object returned from ProcessStageImpl, not its argument. Stage processing semantics preclude side effects.

C. Selectors

A selector instance encapsulates a

Predicate<T> defined on its pipeline's type T (e.g., ContentPredicates). Selectors are used to make flow control decisions during pipeline execution. Selectors can be implemented by the concrete class:

public class PipelineItemSelector<T>

The selector's predicate is exposed by the following method.

public bool IsItemSelected(T item)

D. Destinations

Destinations represent the consumers of the pipeline's processed data. In some examples, a collector can be configured to select destination sets, and whether a destination set is scaled or non-scaled, with use of a configuration template.

1. Destination Sets

Destination sets represent a set of destinations. Destination sets come in two flavors, Scaled and Non-Scaled. For the scaled flavor, the destination set can be made a first class concept, beyond just a list.

2 Non-Scaled Destination Set

The destinations in a non-scaled destination set are each an independent consumer of the processed data. Processed data will be presented to each destination in the set. Each of the destinations is allowed to define a selector. If the destination has a selector, it will publish the data that is selected by its selector. A destination with no selector defined will publish all data presented to it. Depending on the use of selectors it is possible for any given item to be published to any subset of destinations, including none.

E. Scaled Destination Set

It is often desirable for disclosed collector systems and frameworks to be expanded to a massive scale. Thus, it is desirable to horizontally scale collectors efficiently such that no enterprise is too big for all data produced to be processed. Typically, the throughput of the syslog destinations becomes a limiting bottleneck. Thus, the disclosed technology can support destinations that are also scaling horizontally. A scaled destination set is one where the destinations included in the set represent a single logical destination with multiple endpoints, such that each processed item should be published to no more than one destination of the set.

Just as in the non-scaled sets, scaled destinations are allowed to define a selector. The scaled destination set partitions its destinations into two sub-collections: those that have a selector defined, and those that do not. The sub-collection of destinations that have a selector defined is considered to be ordered. When an item is dispatched to a scaled destination set, it presents that item to each destination with a selector in order. The first destination with selector to select the item publishes the item; the item is not presented to any other destinations in the set. If no destination with selector selects the item and the sub-collection of destinations without selector is non-empty, then a non-selector destination is chosen randomly (but with affinity) to publish the item.

Affinity can managed by the pipeline type T implementing the IPipelineItem interface. This interface exposes a consistent id whose modulus is used as an offset into the array of non-selector destinations. Pipelines of types that do not implement IPipelineItem are possible but there is no guarantee of scaled destination set non-selector destination affinity.

Consumers may have horizontal scaling built-in, exposing a single endpoint and hiding the details of the individual stores. Such a consumer would be configured as a single destination. The scaled destination set supports consumers that do not have scaling built-in.

F. Pipeline Operation

1. Stage Propagation

The pipeline includes a set of ordered stages. An object inducted into the pipeline is presented to the first pipeline stage. A stage performs a transformation of the data. In general the result of each transformation is presented to the next stage in the pipeline. There are two exceptions where a stage is presented data other than that produced by the preceding stage.

2. Stage Selectors

A stage is allowed to define a selector. If a stage has a selector then an item that is not selected is not processed by that stage. When an item is rejected by a stage the item is presented to the next stage unaltered.

3. Destination Only Stages

A stage can be defined as destination only. When this is the case the result of its processing is not put back into the pipeline. The succeeding stage sees the same data as the destination only stage.

4. Publishing

Publishing data to consumers does not only occur at the end of the pipeline. Destination sets belong to stages. Each stage may have its own consumers. A stage can define an arbitrary number of destination sets scaled or non-scaled. Behaviorally having multiple non-scaled destination sets is not different than having one non-scaled destination set with the union of all the others' destinations.

5. Pipeline Formatting Stages

Formatters append to a log a named textual representation of the data included in the log. Formats are generally defined by a destination. Calculating the format makes the log more easily consumable by that destination.

Suitable formats for use by destinations include CEF, a standard defined by HP Arcsight and delimited—the delimiter used and property list included are configurable. A regex replace expression can be supplied to fix data elements that may contain the delimiter.

6. Pipeline Filters

As mentioned above the pipeline type employed by the example collector is named LogMessages and represents a set of logs from a single agent. A filter stage transforms a LogMessages instance by removing logs that do not meet the filter criteria. Selectors are used for flow control within the pipeline. Selectors determine whether a certain portion of the pipeline processes an item or not. A filter actually changes the contents of an item, such that downstream portions of the pipeline will see the changes.

7 Example Pipeline Filters

Regex Filter—the regex filter allows matching a regex pattern against either the message text, the event id, or a previously calculated format. Regex filters can include or exclude.

Everything Filter—removes all logs. Optimization used in concert with a selector when the selector criteria is the same as the desired filter criteria. Avoids looping when the outcome is predetermined.

G. Classification

Classification applies a set of tags to a log from a taxonomy defined by, for example, the Mitre CEE standard. A benefit of classification is that it enables searching for logs by their meaning without needing to know the myriad textual details used by all the applications in the environment.

H. Example Selectors

Examples of selector criteria that can be used in certain examples of the disclosed technology include:

1. CIDR IP

The Classless Inter-Domain Router (CIDR) IP selector criterion takes as a constructor argument a CIDR block and selects on the basis of having an IP within the block. In other examples, a more general IP range selector can be used.

2 Hostname Regex

The Hostname Regex takes a regex pattern as a constructor argument and selects on the basis of having a hostname matched by this pattern.

3. Source

Every LogMessages instance inducted into the system is assigned a "source." In this context, sources are defined as a hierarchical set of qualifiers. The hierarchy is more or less analogous to the hierarchical nature of configuring loggers. The set of qualifiers varies based on the plugin that sent the data.

4. cnfwel Source Example cap.cnfwel.Application

In this example "Application" is the name of the Windows Event Log the event came from.

5. cnftail Example cap.onftail.collector.stats

In this example the last two qualifiers are the application and log source names which come from the collector tail configuration template that drives tail configuration.

The "." delimited string notation is convenient for documentation, and can be seen in the collector application logs, but the runtime representation of a source is not a string. A source selector can use as many qualifiers as desired. The source selector "cap" would select all data that the collector currently processes. The collector can generates two log files, CnFLog.txt and stats.txt. The source selector "cap.cnftail.CnF" would select all CnF logs.

6. Business Context

The Business Context selector allows selecting on retrieved asset tag information and applied to log messages.

I. Example Destinations

The following destinations can be implemented in certain examples of the disclosed technology.

1. File Destinations

A file destination is a file into which processed data is streamed. In some examples a library RollingFileAppender is used to write destination files. The collector exposes the max size and max roll count properties of the RollingFileAppender to allow the user to configure the rolling behavior.

2 Syslog Destinations

The collector will publish logs to syslog servers. The collector supports both UDP and TCP protocols. The collector also supports both RFC3164 and RFC5424 syslog formats. The syslog sender library used by the collector supports sending TCP encrypted data.

J. Example Collect and Forward Pipeline Configuration

In some examples of the disclosed computing platform, the collector contains not only the pipeline's base classes, but also a set of protobuf messages for defining the structure of a pipeline. Protobuf can be used not only for formatting messages over ActiveMQ but for all of its object serialization. The collector pipeline defined using these protobuf messages is written to disk in a JSON format. At run time this file is read and the appropriate pipeline is instantiated. Stages, selector criterion behaviors, and destinations are all defined as abstract base classes. The description of a concrete instantiable pipeline necessarily refers to things out of scope, but this can be addressed by describing the concrete extensions of abstract classes as ActivationTypes.

K. Pipeline IDL

Table 1 provides an example IDL used to define a collector ProcessingPipeline. This IDL references the RootPredicate message:

TABLE 1

```
//Defines combined selection criteria. When multiple criteria are included all
must be satisfied.
message PipelineItemSelectorDefinition {
   required collector.Predicate.RootPredicate criteria = 1;
   //meaningful name creates more understandable log messages
   optional string name = 2;
}
//Defines a destination a stage can publish to.
message DestinationDefinition {
   //Activation info for a type that extends Destination
   required collector.ActivationInfo.TypeActivationInfo activationInfo = 1;
   //Criteria for testing whether a particular bundle will be sent to this
destination
   optional collector.Pipeline.PipelineItemSelectorDefinition bundleSelector =
2;
   //meaningful name creates more understandable log messages
   optional string name = 3;
   //Spill data sent to this destination or which has already been queued for
this destination?
   optional bool spillMode = 4 [default = false];
}
//Defines a publisher that can output logs.
message DestinationSetDefinition {
   //list of activation info for types that extend Destination
   repeated DestinationDefinition destinations = 1;
   //Only relevant when multiple destinations are defined. When true an item
will only get published to the first satisfying destination.
   //When false a bundle will get published to all satisfying destinations,
   optional bool scaled = 2 [default = true];
   //meaningful name creates more understandable log messages
   optional string name = 3;
}
//Defines an object instance that extends PipelineStage,
message PipelineStageDefinition {
   //ActivationInfo for an instance of PipelineStage.
   required collector.ActivationInfo.TypeActivationInfo stageActivationInfo =
1;
   //meaningful name creates more understandable log messages
   optional string name = 2;
   //List of destination sets published to with the results of this stage.
   repeated DestinationSetDefinition destinationSets = 3;
   //If true, any transformations on the data made by this stage are visible
```

TABLE 1-continued

```
only to this stages destinations, not to subsequent stages.
    optional bool destinationOnly = 4 [default = false];
    optional PipelineItemSelectorDefinition selector = 5;
}
PipelineDefinition {
    repeated PipelineStageDefinition PipelineStages = 1;
    optional bool inductorsEnabled = 2 [default = true];
}
```

VIII. Example Parsing and Formatting

A. Example Log Parsing

The internal log representation within a collector includes an optional field named "parsing." The contents of this field when populated are a set of key/value pairs. To perform parsing, the ProcessingPipeline includes the ParsingPipelineStage. An example web sequence diagram for parsing is displayed in FIG. 6.

Figure 6:
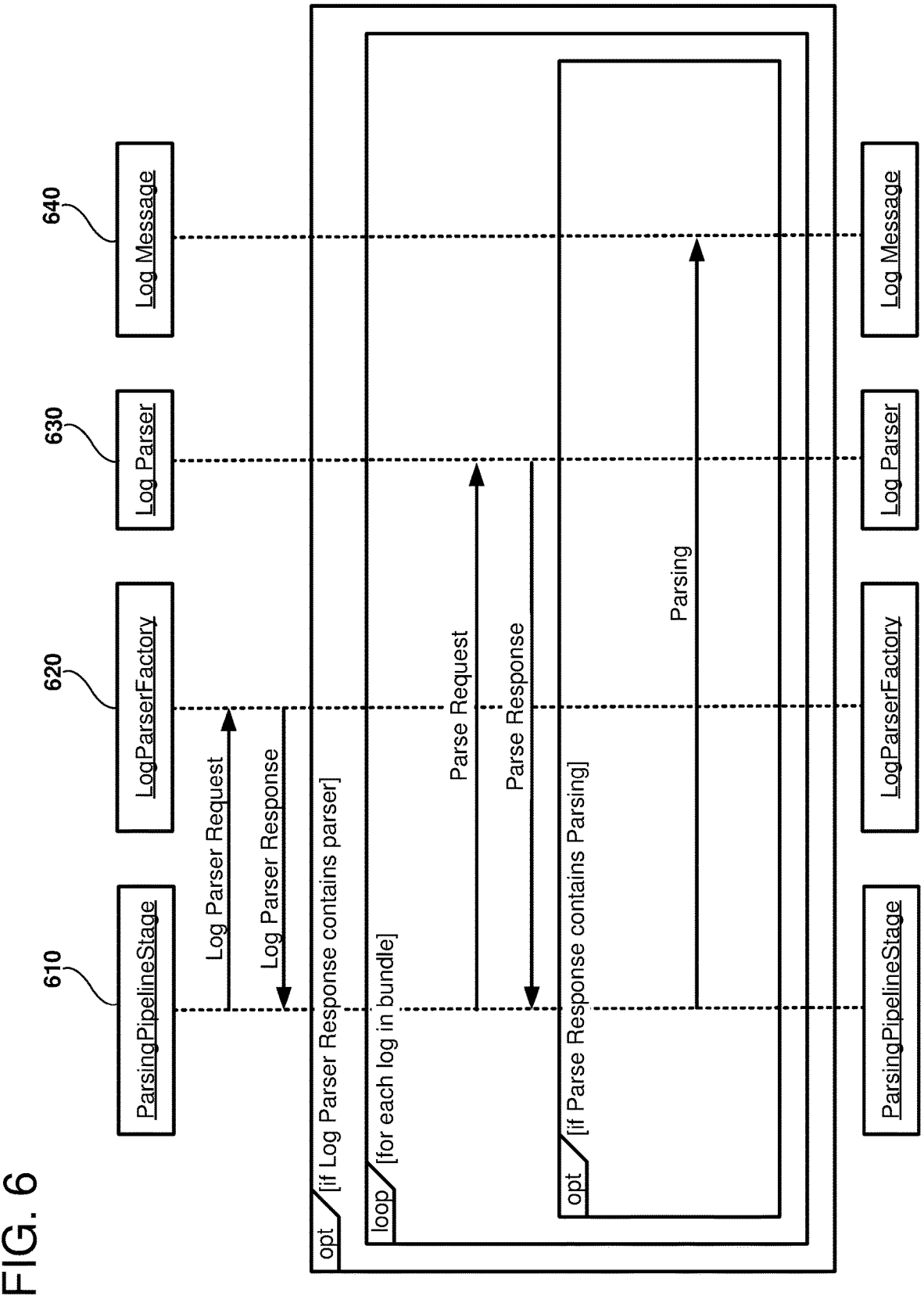
FIG. 6 is a diagram outlining examples of messages passed during pipeline parsing, as can be performed using a collector according to certain examples of the disclosed technology.

FIG. 6 is a diagram 600 outlining examples of messages passed during pipeline parsing as can be performed using the disclosed collector. A parsing pipeline stage 610 sends log parser requests to a log parser factory 620 and an appropriate response is returned. If the log parser response contains a parser then for each log in the bundle a parse request is sent to the log parser 630 and a parse response is sent by the log parser 630 in return. If the parsed response contains parsing, then parsing is performed and the enhanced data is sent to the log message queue 640.

It should be noted that the source application of the logs is part of a log parser request. The log parser included in the response is specific to the source application of the logs being parsed. The parsing created will contain keys defined by the source application documentation. This provides at least two benefits. The author creating the parser content can focus on the application's documentation, and define the parsing in the terms of that documentation. Thus, when creating formatting content the context of the original application source is not lost, there is no "telephone" effect of translating the translation.

A log parser extends the LogParser abstract base class. For every application log format for which parsing is supported a concrete LogParser implementation with constructor arguments specific to that application log format will be prepared as a protobuf JSON file. LogParsers will be instantiated at run time from these files as ActivationTypes. Selecting the correct log parser JSON file is done via a folder and file naming convention. From the root folder, the subfolders use the qualifiers of the LogMessageSource for the application. The IIS web server supports three completely different log formats, W3C, IIS, and NCSA. NCSA is the original format introduced by Mozilla and is available for backward compatibility with legacy applications. Selecting a parser file other than the default is accomplished by matching the prefix of the file name to the "contentName" property of the bundle's "parsingContent" property. The parsingContent property provides additional contextual data necessary to accommodate special use cases.

B. Log Parser Implementations

A number of concrete extensions of the abstract base class LogParser are envisioned. Each of these extensions is intended to satisfy a general parsing strategy. The idiosyncrasies of a particular application should be handled by the arguments used to construct the specific parser instance for that application. The LogParser extensions already implemented or already planned are detailed below.

1. Delimited File Log Parser

The DelimitedFileLogParser is used to split a delimited log file into fields. Many IIS formats (IIS and W3C) are delimited and use this parser. The signature of the constructor is below public DelimitedFileLogParser(string delimiter, string nil, List<string> fields)

Table 2

The optional nil item is used if the file contains a non-empty place holder value to indicate missing. Specifying a value for nil will suppress this value from being added to the parsing. As a concrete example of how a log parser can be expressed as a content file, the contents of an example IIS.parser.json file are provided in Table 3. In this example, the delimiter is a comma (",") and the nil value is a hyphen ("-"). The list of fields was derived from the IIS documentation and the names appearing here are unchanged from that documentation.

TABLE 3

```
{
    "fullyQualifiedTypeName":
"CnF.Collection.PipelineProcessingStages.Parsing.
DelimitedFileLogParser",
    "assemblyName": "CnF.Collection",
    "constructorparameters": [
        ",",
        "-"
    ],
    "constructorCollectionParameters": [
        {
            "items": [
                "ClientIPAddress",
                "UserName",
                "Date",
                "Time",
                "ServiceAndInstance",
                "ServerName",
                "ServerIPAddress ",
                "TimeTaken",
                "ClientBytesSent ",
                "ServerBytesSent ",
                "ServiceStatusCode",
                "WindowsStatusCode",
                "RequestType" ,
                "Target",
                "Parameters"
            ]
        }
    ]
}
```

2 Regex Log Parser

A regular expression (regex) parser is used when the structure of the log messages is less uniform than in a delimited file. It is typical that an application log that uses regex parsing will require a set of regexes, as the logs will vary beyond what one regex can match. This form of parsing can be slow as there is additional work to identify the correct regex from the set.

3. XML Log Parser

The XML log parser parses logs represented as XML. An example of an application that uses this parser is the Windows Event Log (WEL). These logs are represented internally by Windows as XML.

C. Example Formatting Features

Formatting features enable the creation of textual log representations that adhere to some standard, or otherwise allow integration with some third party log consumer. Similar to parsing, formatting features can be defined in the terms defined by the application originating the log, a format is defined in the terms of the standard defining the format or the application for which the format is an integration. In the "normalized" world where every log has been parsed into a universal structure, formatting requires only a single map, from the "normalized" field set to the format's field set. In other examples, where each log is parsed using the terms defined by its originating application, a map is used for every application to be formatted.

Figure 7:
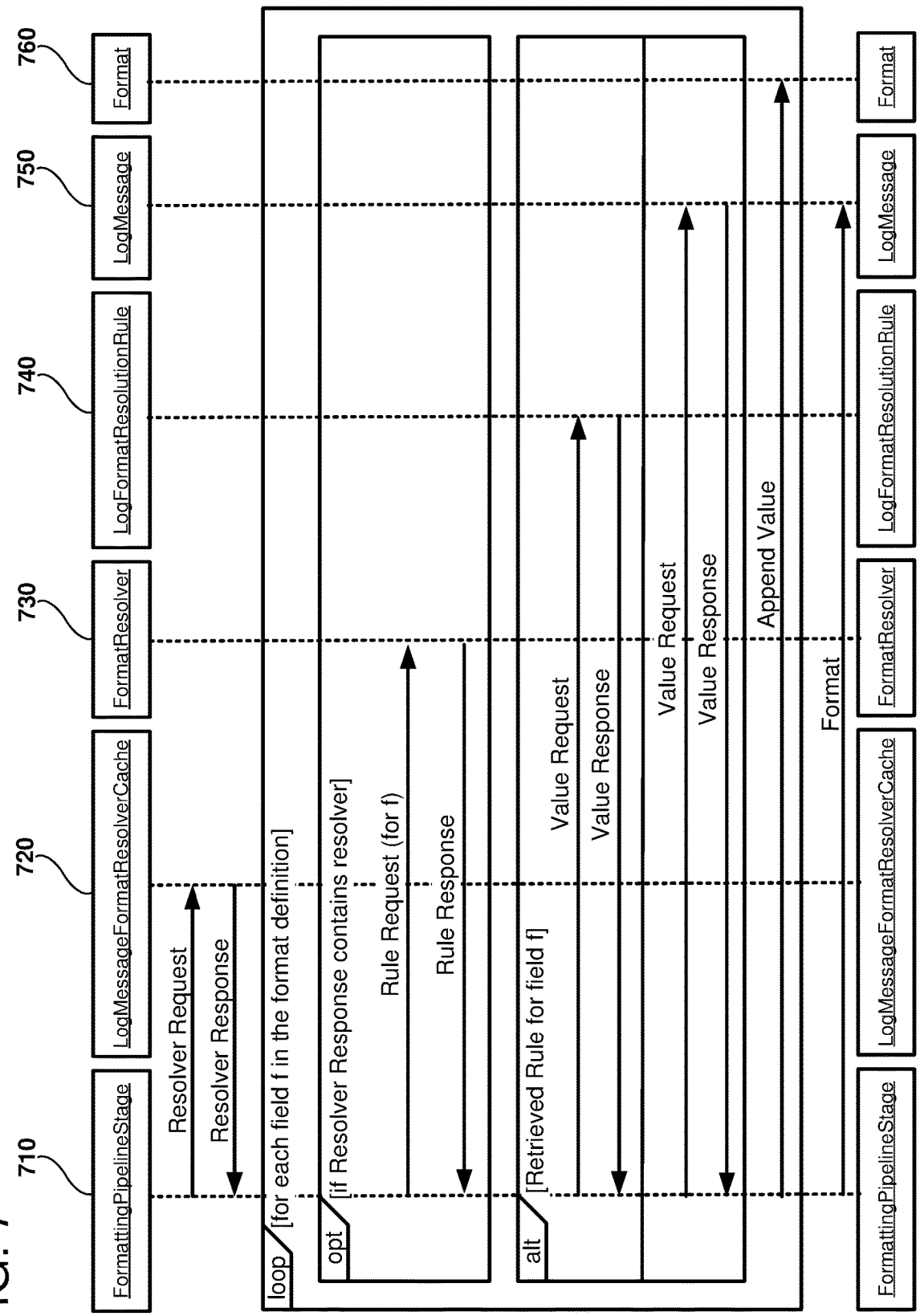
FIG. 7 outlines an example of messages sent during a format resolution sequence, as can be performed using certain examples of the disclosed technology.

FIG. 7 outlines an example of messages sent during a format resolution sequence as can be performed using the disclosed collector. The formatting pipeline stage 710 sends a resolve request to a log message format resolver cache 720 which sends a resolver response message. Then, for each field in the format definition, if the resolver response contains an associated resolver, then a role request is sent to a format resolver 730. The format resolver resolves the request and sends a rule response to the formatting pipeline stage 710. The formatting pipeline stage 710 uses retrieved rules for the associated field and sends a value request to a log format resolution rule 740 and receives a value response in return. If, on the other hand, there is no rule associated with the field, then a value request is sent to the log message component 750 and a value response is received. The formatting pipeline stage 710 then appends a value and sends to the format component and also sends a formatting message to the log message component 750.

D. Format Resolvers

Maps from a certain parsing to a particular format are referred to as "format resolvers." A format resolver is represented at runtime as an instance of the concrete class LogMessageFormatResolver. The LogMessageFormatResolver class field includes a collection of pairs

[formatted field name, LogMessageFormatResolutionRule]

where LogMessageFormatResolutionRule is an abstract base class that defines the following method:

public abstract string Resolve(LogMessage log);

Each LogMessageFormatResolutionRule knows how to construct the value of its corresponding formatted field from a log that has the appropriate parsing.

E. Format Resolvers are Content

At runtime format resolvers are constructed from content files. The content files contain a serialized protobuf message of type ResolverDefinition as defined by the following IDL in Table 4.

TABLE 4

```
message ResolutionRuleDefinition {
    required string outputFieldName = 1;
    required collector.ActivationInfo.TypeActivationInfo
    activationInfo = 2;
}
message ResolverDefinition {
    repeated ResolutionRuleDefinition rules = 1;
}
```

The resolution rules are defined as ActivationTypes. Each rule is an instance of a concrete LogMessageFormatResolutionRule extension that implements the appropriate resolution strategy constructed from arguments appropriate to the formatted field to which the rule corresponds. As an example, Table 5 includes an excerpt including some of the more interesting rules from the format resolver content file from IIS W3C parsing to CEF format.

TABLE 5

```
{
    "rules": [
        {
            "outputFieldName": "dvchost"
            "activationInfo": {
                "fullyQualifiedTypeName":
"CnF.Collection.Resolution.Rules.CustomRegexResolutionRule",
                "assemblyName": "CnF.Collection",
                "constructorparameters": [
                    "cs-host",
                    "^[^:]+"
                ]
            }
        },
        {
            "outputFieldName": "rt",
            "activationInfo": {
                "fullyQualifiedTypeName":
"CnF.Collection.Resolution.Rules.PatternResolutionRule",
                "assemblyName": "CnF.Collection",
                "constructorparameters": [
                    "{0}, {1}"
                ],
                "constructorCollectionParameters": [
                    {
                        "items": [
                            "date",
                            "time"
                        ]
                    }
                ]
            }
        },
        {
            "outputFieldName": "Severity",
            "activationInfo": {
                "fullyQualifiedTypeName":
"CnF.Collection.Resolution.Rules.RegexMatchSelectionResolutionRule",
                "assemblyName": "CnF.Collection",
                "constructorparameters": [
                    "sc-status"
                ],
                "constructorCollectionParameters": [
                    {
                        "items": [
                            "\\b2\\d{2}\\b",
                            "\\3\\d{2}\\b",
                            "\\b[45]\\d{2}\\b"
                        ]
                    },
                    {
                        "items": [
                            "Low",
                            "Medium",
                            "High"
                        ]
                    }
                ]
            }
        },
    ]
}
```

Like parsing the selection of the appropriate format resolver content file is handled by path and file name conventions. The paths to the format resolvers for two supported parsings, IIS to CEF and W3C to CEF format are found at the following paths.

C:\ProgramData\ . . . \cnftail\IIS\CEF\IIS.resolver.json
C:\ProgramData\ . . . \cnftail\IIS\CEF\W3C.resolver.json These paths are similar to the parsing paths described above except that because there is a resolver for every format, the format name (CEF in this case) is part of the path. If the IIS application did not have two different file formats, there would be just a single resolver file named default.resolver.json. The different files are used because IIS has multiple file formats. Like parsing, the IIS resolver content is embedded in the application so it is not necessary to deploy these files. Resolver content files are deployed to support applications which are not built-in, or to override the default behavior for built-in applications.

F. Currently Implemented Formatting Pipeline Stages

Formatting behavior is added to the ProcessingPipeline by adding a pipeline stage that extends the abstract base class FormattingPipelineStage.

1. CEF Formatter

The CEF format can be used with, for example, the Hewlett-Packard (HP) ArcSight enterprise security management system. Forwarding to an ArcSight destination is most effective if the logs have a CEF format applied. CEF defines a dictionary of almost 120 fields.

2 Custom Delimited Formatting Stage

Customers can define a custom delimited format for logs. To do so, the ProcessingPipeline should include a DelimitedFormattingStage. The constructor parameters to DelimitedFormattingStage need to include the format name, the delimiter to use, and the list of field names.

G. Example Format Resolution Rules

An example ConstantResolutionRule constructor has the format:
 public ConstantResolutionRule(string constantValue)

This rule yields the constant value supplied in the constructor, but does not actually interrogate a log.

An example CustomRegexResolutionRule constructor has the format:
 public CustomRegexResolutionRule(string propertyName, string regexPattern)

The supplied regex is matched against the log's value for the supplied property name. The regex match value is yielded.

An example IPV4RegexResolutionRule constructor has the format:
 public IPV4RegexResolutionRule(string propertyName)

This rule is used for log properties that may or may not contain an IPv4 address. For instance certain IIS fields can contain either an IPv4 or IPv6 address. Some agent data consumers will reject logs with IPv4 addresses in IPv6 fields. This rule yields the value of the supplied property name from the log if it matches an IPv4 regex pattern.

An example IPV6ResolutionRule constructor has the format:
 public IPV6ResolutionRule(string propertyName)

This rule yields the value of the supplied property name from the log if it validates as an IPv6 address. In some examples, the rule is implemented using regular expressions. In some examples, the .NET framework's IPAddress.TryParse( ) method is used. When this succeeds the returned IPAddress can be interrogated as to its family. If the family proves to be AdressFamily.InterNetworkV6, the value is yielded.

An example LookupResolutionRule constructor has the format:
 public LookupResolutionRule (string propertyName)

This rule yields the value of the supplied property from the log, no processing or validation is performed.

An example PatternResolutionRule constructor has the format:
 public PatternResolutionRule(string formatString, List<string> properties)

This rule yields a formatted string using the supplied format string with the values of the supplied properties from the log in order as replacements.

An example RegexMatchSelectionResolutionRule constructor has the format:
 public RegexMatchSelectionResolutionRule(string propertyName, List<string> patterns, List<string> matchSelections)

This rule acts like a switch statement. The patterns are regex patterns. These regexes are matched against the value of the supplied property name until one matches. The match selection with corresponding index to the matched regex is yielded. The patterns and matchSelections lists must be the same length. This is validated by the constructor.

IX. Log Message Source

The Log Message Source is another concept in certain examples of collectors. The Log Message Source indicates where log messages came from. The Log Message Source is assigned to each log message bundle at the time the bundle is inducted into the system. The assignment is done by the relevant factory class (e.g., by a concrete implementation of CapLogMessageFactory).

A. Structure

A Log Message Source consists of a Primary Qualifier (which is required), and zero or more Secondary Qualifiers.

The Primary Qualifiers indicated the type of data being handled (e.g., "cap" for certain agent examples), and the first Secondary Qualifier is the name of the plugin which collected the data (e.g., "cnfwel", "cnftail"). Other Secondary Qualifiers further specify where the data came from, as described below.

B. CNFWEL

For Windows Event Log data collected by the CNFWEL plugin, the Log Message Source can be named, for example:
 cap.cnfwel.Security
 cap.cnfwel.Application

C. CNFTAIL

For tail data collected by the CNFTAIL plugin, the Log Message Source can be named, for example,
 cap.cnftail.iis.DefaultWebSite
 cap.cnftail.iis.website1
 cap.cnftail.MyCustomApp.MyLogSourceName D. Example Use of Selectors An important use for the Log Message Source is to select bundles for processing by a given processing stage. For example, a user or administrator can define a selector for a processing stage so that only IIS data is processed, or more specifically, only IIS data for a given website. Or, a selector can be defined to process only WEL data from the Security log.

In some examples, Selection by Log Message Source is hierarchical. For example, given the Log Message Source cap.cnftail.iis.website1, any of the following selectors will match:
 cap
 cap.cnftail
 cap.cnftail.iis
 cap.cnftail.website1

By default, selection is not case-sensitive, but case sensitivity can be turned on.

E. Parsing and Formatting

Parsing and formatting use the hierarchical structure Log Source Name for locating relevant content on the file system.

For example, a CEF formatting stage intended for use with a W3C formatted IIS logfile, collected from the CNF-TAIL plugin, would normally have its content here:

C:\ProgramData\ . . . \cnftail\IIS\CERW3C.resolver.json

Incoming bundles whose Log Message Source is cap.tail.cnftail.IIS.website1 would find the relevant content based on the overlapping parts of the Log Message source and the directory hierarchy.

X. Log Message IDL

An example IDL used to represent log messages within the Collect and Forward system is included below in Table 6 for reference

TABLE 6

```
    // The source of the log message.
message LogMessageSource {
    required string primaryQualifier = 1;
    repeated string secondaryQualifier = 2;
}
message LogMessageFormat {
    //distinguishing identifier of the format type
    required string format_name = 1;
    //the log message expressed in the format
    required string formatted_text = 2;
}
    //represents a value extracted from a log message
message LogMessageParsedField {
    required string fieldName = 1;
    required string fieldvalue = 2;
}
    //represents a set of values extracted from a log message
message LogMessageParsing {
    repeated LogMessageParsedField fieldvalues = 1;
}
    //metadata needed to successfully execute log parsing
message LogMessageParsingContent {
    optional string contentName = 1;
    repeated string fieldNames = 2;
}
    //Represents a log message from an application or device.
message LogMessage {
        //DateTime the event occurred expressed in ISO-8601 format
    optional string timestamp = 1;
        //IPv4 address
    optional string ipv4 = 2;
        //Text of the event
    optional string msg = 3;
        //Host name of the host that generated the event
    optional string host = 4;
        //Agent uuid if this log was collected from a CAP agent, otherwise this will be missing.
    optional string agent_uuid = 6;
        //this is identifier the application originating the log uses to distinguish it. Some applications put ids on their logs and some do not
    optional string event_id = 7;
        //the name of the vendor of the application originating the log.
    optional string vendor = 8;
        //the name of the product originating the log
    optional string product = 9;
        //the version of the application generating the log
    optional string version = 10;
        //additional textual formats of the log message applied by formatters
    repeated LogMessageFormat formats = 11;
        //set of key value pairs extracted from the log.
    optional LogMessageParsing parsing = 13;
}
    //Extension of the CAP sequence number that allows unlimited dimensions.
message StreamElementSequenceNumber{
    required uint32 major = 1;
    repeated uint32 minorAndBeyond = 2;
}
    //A set of logs from the same stream on the same host. The CnF documentation frequently refers to a LogMessages instance as a "bundle".
    //
    //At the inception of the project the only source of LogMessages instances were CAP envelopes containing WelData or TailFileData. It
    //was anecdotally true that these are always from the same stream of the same host. The design of CnF has made this a defining feature
    //of the LogMessages message. If some future source of data makes this less natural it is still the responsibility of any future
    //LogMessages factories to maintain the integrity of the logs contained within the bundle.
```

TABLE 6-continued

```
message LogMessages {
      //set of logs
    repeated LogMessage log = 1;
      //unique identifier for the stream from which the bundle was read. CnF
has both processing thread affinity and destination affinity for streams.
      //The construction methodology of a stream id is a detail of the factory
creating the bundle. It is not important that different factories use
      //similar methodology but it is important that stream ids are unique
within the stream space. For CAP data the stream id is of format {0}:{1}
      //where {0} is the standard guid string format of the agent uuid and {1}
is the enumerated value of the source plugin.
    optional string stream_id = 2;
      //Indicates the type of stream. This is applied by the LogMessages
factory and allows interpretation of the stream id in case there
      //is useful data embedded.
    optional string stream_type = 3;
      //The sequence number of the bundle. For CAP data this is just the CAP
envelope sequence number. The CnF extension that allows adding
      //dimensions allows CnF to pass these messages in chunks while still
retaining the original identity of the message.
    optional StreamElementSequenceNumber sequence_number = 4;
      //More granular indication of the type of logs contained in the the bundle
With a few caveats LogMessageSource can be considered an identifier
      //for the application that orignated the log. LogMessageSource is used
heavily within CnF to define Selectors (pipeline control flow) as well
      //as the method of looking up parsing and formatting content,
    optional LogMessageSource source = 5;
        //Contextual data used by the parsing feature.
    optional LogMessageParsingContent parsingContent = 6;
}
```

XI. ActiveMQ Resource Provider Consumer Pattern

An example pair of abstract base classes for implementing an ActiveMQ Resource Provider Consumer Pattern are shown in Table 7.

TABLE 7

```
    public abstract class ActiveMQResourceConsumer<TAuto, TRequest,
TRequestBuilder, TMessage, TMessageBuilder> : MessageHandler<TMessage,
TMessageBuilder>
        where TAuto : ActiveMQResourceConsumer<TAuto, TRequest,
TRequestBuilder, TMessage, TMessageBuilder>
        where TRequest : Google.ProtocolBuffers.GeneratedMessage<TRequest,
TRequestBuilder>
        where TRequestBuilder : GeneratedBuilder<TRequest, TRequestBuilder
new ( )
        where TMessage : Google.ProtocolBuffers.GeneratedMessage<TMessage,
TMessageBuilder>
        where TMessageBuilder : GeneratedBuilder<TMessage, TMessageBuilder
new ( )
    public abstract class ActiveMQResourceProvider<TAuto, TRequest,
TRequestBuilder, TMessage , TMessageBuilder> : MessageHandler<TRequest,
TRequestBuilder>
        where TAuto : ActiveMQResourceProvider<TAuto, TRequest,
TRequestBuilder, TMessage, TMessageBuilder>
        where TRequest : Google.ProtocolBuffers.GeneratedMessage<TRequest,
TRequestBuilder>
        where TRequestBuilder : GeneratedBuilder<TRequest, TRequestBuilder> ,
new ( )
        where TMessage : Google.ProtocolBuffers.GeneratedMessage<TMessage,
TMessageBuilder>
        where TMessageBuilder : GeneratedBuilder<TMessage, TMessageBuilder>,
new ( )
```

One advantage of this pattern is that almost all of the code is in the base classes. Other than the parameterized type and a few bookkeeping details, the concrete extensions do not need to provide any functionality.

A. Type Parameterization

The base classes are highly type parameterized. The protocol is built on a protobuf request response message pair. The types of these two messages are part of the type parameterization. The builder types for these two messages also are part of the type parameterization, it is necessary to have the builder types in order to be able to construct instances of these messages in a polymorphic way.

A second type parameter is named TAuto; its usage is when defining an extension class Foo, TAuto is Foo, so that TAuto is self-referential. This allows the ability to define a static instance property on the base class and have it inherited by all subclasses, providing static inheritance.

B. Protocol

The protocol can be implemented based on a protobuf request response message pair. The response message is considered the "resource" as referred to in the class names.

C. Resource Provider

The resource is persisted to disk as JSON serialized protobuf on the file system local to the provider. The provider's serialized copy of the message is the master copy. When a provider is instantiated it checks for the existence of the resource. If it is found the resource response is published to an ActiveMQ? topic for all resource consumers. Additionally the resource provider creates a listener for resource requests. The receipt of a resource request causes a resource response to be emitted if the resource exists. If the resource does not exist, resource requests can be silently ignored.

The resource provider exposes a settable property of the type of the resource. When the setter is called the new value is equality checked against the existing master copy of the resource. If the new value is equal to the previous value the new value is silently ignored. If the new value is different the master file is updated and a resource response message is published.

The resource provider is not responsible for the injection of a new resource into the system. The provider is responsible for maintaining the master file and communicating the resource to consumers.

D. Resource Consumer

The resource consumer can also write a copy of the resource to disk on its local file system. This copy of the resource is a cache. The existence of the cache allows the consumer to operate when disconnected. The location and/or file name of the consumer's cached copy is different from the provider's master copy. Thus, if the provider and consumer share a file system, two copies will simultaneously exist.

When a consumer is instantiated it initializes itself with the cached copy of the resource from disk, if it exists. The consumer also creates a listener for the resource response message and publishes a resource request.

When a resource response is received its contents are equality checked against the consumer's cached copy if there is one. If a cached copy of the resource exists and is equal to the contents of the received resource, the resource response is silently ignored. If the consumer did not already have a cached copy, or the new response differs from the cached copy, the cache is updated to contain the new resource and interested parties are informed of the new resource.

XII. Example Method of Generating Agent Augmentation Data

Figure 8:
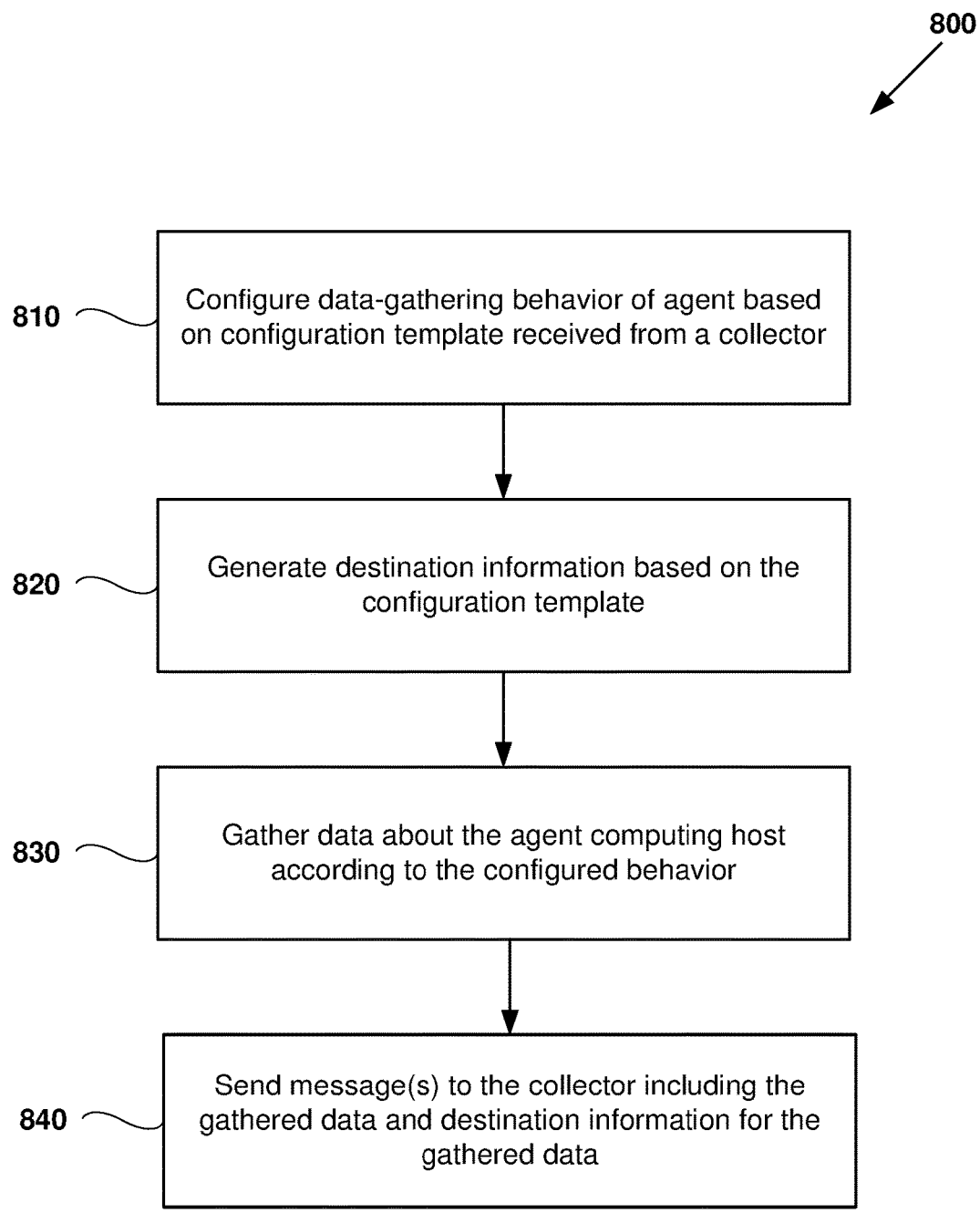
FIG. 8 is a block diagram outlining an example method of generating augmentation data with an agent, as can be performed in certain examples of the disclosed technology.

FIG. 8 is a block diagram 800 outlining an example method of generating augmentation data with an agent executing on a computing host as can be performed in certain examples of the disclosed technology. For example, the agent discussed above regarding FIG. 1 can be used to implement the disclosed method. At process block 810, data gathering behavior of an agent is configured based on a configuration template received from a collector. The template can describe formats and parameters of fields for attributes and parameters of the agent to be collected. Once the agent has been configured, including any events associated with the plug-ins, the method proceeds to process block 820.

At process block 820, destination information is generated based on the configuration template. For example, the destination information can include object or file names and formats for sending the data to one or more destinations via a collector.

At process block 830, the agent gathers data about its computing host according to the behavior that was configured at process block 810. For example, configuration change data or file integrity monitoring data can be gathered and sent according to formats specified by the configuration template. The data can be gathered and spooled such that the data is not sent until network conditions and/or agent load are more desirable for sending such messages. Thus, the amount of storage and computing power used at the collector can be reduced because the agents essentially offer a large amount of data prior to sending their data to the collector.

At process block 840, the agent sends one or more messages to the collector including the gathered data and destination information for the gathered data. For example, during the configuration of the agent at process block 820, the designation can be specified by an IP address, a service name, or other suitable technique for describing a suitable destination. Thus, when the messages are sent to the collector, the collector itself does not need to determine the destination. In other words, the collector can simply forward along data from the agent, without sophisticated processing of the received data.

XIII. Example Agent Plugin Configuration

Collectors and destinations can consume data from several different plugins. Plugins expect to receive a configuration message that describes to the plugin what data to collect and includes configurable processing instructions supported by the plugin. The structure of a configuration message can be specific to the plugin for which it is intended. Despite the differences in the structure of configuration messages between plugins, a fairly uniform model for specifying configurations for supported plugins can be defined.

A. Configuration Templates

For each supported plugin the collector defines a configuration template. The CnF configuration template directs the collector on how to publish a plugin configuration message that will cause the plugin to deliver the data to be received by the collector. Configuration templates are defined as protobuf messages and are stored as files on disk as protobuf JSON serializations of their template instance.

It is expected that the contents of configuration templates will vary customer to customer as they express the details of the data the customer wishes to collect. In some examples, an interface is provided to assist users in the definition of their configuration templates.

The configuration template defined by the collector should not be confused with the configuration message defined by the plugin itself. These two messages are not the same, but there is a relationship between them. The collector plugin configuration template will contain many of the same fields as the plugin's configuration message, as the plugin's configuration message is derived from the collector's configuration template, but the collector configuration template may also include fields only of interest to a collector itself but are not understood by the plugin.

B. Plugin Configurers

For each supported CAP plugin a plugin configurer is defined. A plugin configurer is a class (e.g., defined in C#) that implements plugin configuration. A simplified example of an ICapPluginConfigurer interface is provided below in Table 8. This interface supports the configurer calculating whether the current plugin configuration agrees with the current template, and for generating a new plugin configuration message if the plugin's current configuration disagrees with the template.

TABLE 8

```
public interface ICapPluginConfigurer : IDisposable
{
    IConfigurationComparisonResult
CompareActualConfigurationToDesired(CapAgentOnline capAgentOnline);
    Tlc.Cap.Envelope GetConfigurationMessage(CapAgentOnline capAgentOnline
IConfigurationComparisonResult precalculatedConfigurationInfo);
}
```

It is common that plugins share enough structure that each plugin configurer has been able to extend the abstract base class named PluginConfigurer and thereby inherit a good chunk of its functionality. Having this base class is desirable for code reuse, but should a future plugin for some reason not be able to extend PluginConfigurer, this can be handled within the example framkework. The system is defined in terms of IPluginConfigurer, and any configurer can implement this interface itself.

The set of plugin configurers that gets instantiated at run time is configurable. The set of configurers instantiated by the system at start up is specified in a configuration file, which includes a list of PluginConfigurers defined as ActivationTypes.

Each plugin configurer defines the name of the file which stores its associated configuration template as a property. The PluginConfigurer monitors the path to its template and is sensitive to changes on the fly. Configuration template changes can be applied to the running system by changing the template files. Configuration template updates can also be provided via a user interface.

C. OnlineAgentsRequest Polling and Server Stateless Configuration

Publishing an OnlineAgentsRequest message induces the agent manager to publish an OnlineAgentsResponse. The collector agent platform server publishes these requests on a configurable time interval to receive the OnlineAgentsResponse from which the server learns about the configuration state of plugins and can update plugin configurations if necessary.

The OnlineAgentsResponse includes a AgentOnline message for every connected agent. The AgentOnline message contains a list of abilityConfiguration messages. Each CapabilityConfiguration expresses a capability that the agent exposes.

The CapabilityConfiguration message has a context_id field. A configuration message sent to a plugin includes a context_id which is returned by the plugin in the context_id field of the CapabilityConfiguration. The contents of the context_id include all of the information included in the plugin's configuration. A collector can determine the correctness of a plugin's configuration by calculating the desired configuration from the configuration template and then comparing to the plugin's actual configuration as expressed by the context_id. If there is agreement between the newly calculated desired configuration and the plugin's context_id then the plugin is correctly configured. If there is a discrepancy, a new configuration message is published to the plugin.

D. Discovery

The information included in the online agents response does not necessarily contain everything necessary to configure a plugin. There are two flavors of information that might be missing.

3. Application Configuration

One type of potentially missing information are details about the configuration of the agent's host that affect how data is collected. If an application whose logs are to be collected allows custom configuration of the location of its log files, the location of the logs must be "discovered" before collection of these files can commence.

4. Data Augmentation

Another type of information that may need to be discovered is contextual details about the host stored on a third party system. For example, suppose that an on-call support phone number for a host is stored in the customer's Active Directory. Augmenting data from the host with the support phone number would be useful if the processing resulted in an alert.

Users can define business context about their assets with Asset View tags. The disclosed techniques allow for augmenting data from a host with its Asset View tag information.

In certain example, in order to support very high throughput and seamless failover, the collector system does not perform lookups on an item by item basis for data augmentation. Any storage mechanism that supported lookups other than in memory typically creates an unacceptable performance penalty. In-memory storage could potentially create a resource utilization problem interfering with the goal of large scale. Such In-memory lookups cause changes to be communicated to every processing server to support fail over. The details of such replication are complex.

Thus, in lieu of the collector server maintaining a store of per host augmentation data, all augmentation data is included in the agent plugin's configuration message, stored by the plugin, and included in every data message received from the plugin. The effect is that every incoming data message includes everything that is needed for its processing. This saves the collector server both the time and storage requirements associated with looking up augmentation data.

E. Two Phase Configuration

Including discovered information in an agent plugin's configuration can be accomplished through two-phase configuration. When the collector configuration server first learns about a new plugin, data from a variety of different sources may need to be retrieved before a complete plugin configuration can be calculated. The collector configuration server can synchronously retrieve all of this data at the time a new plugin is first discovered. The performance issues associated with doing lookups for every data message are not as serious for configuration, because it is typically a less frequent operation. Nevertheless, an asynchronous configuration model can be employed.

When the configuration loop first encounters a new plugin, an appropriate set of discovery requests are published. It is expected that by the next configuration loop all discovery responses are received and a complete configuration can be calculated. If in fact some discovery responses are still outstanding, a best guess configuration calculated from what discovery data is known is published. It is quite possible that the provider for some of the discovery data will be off-line indefinitely.

F. CnF Content Model

One aspect of the disclosed collector system is flexibility adapt to a wide variety of customer use cases. Certain collector examples achieve this by providing extensive control over runtime behavior through configuration and also the ability to extend behavior through content.

S. Protobuf as Serialization Engine

Certain examples of the disclosed collector system use protobuf for serialization. Collector configuration files can be JSON serialized protobuf. Construction of tools to generate collector configuration/content can be done in any language that has available a protobuf generation library.

It should be noted that certain examples of the C# protobuf generator create partial classes. Partial classes allow extending the functionality of a class at compile time. The C# compiler will compile together into a single class any classes declared partial that have identical fully qualified class names. In this way it is possible to add custom functionality to the protobuf generated classes.

For classes that are containers for data but do not have a lot of functionality, extending them as partial classes is often beneficial, for example, using the partial nature of the protobuf generated classLogMessageSource.

For classes associated with large amounts of method code, it is typically better to keep these separate from the protobuf generated class that is used to configure them. A pattern we have used that seems to work is to name the protobuf configuration message FooDefinition? and have a separate class named Foo. A Foo constructor that takes a FooDefinition? argument works well.

G. Activation Types

ActivationTypes describes a general factory mechanism that can be used widely in certain collector implementations. In any context where an object extending some base class or interface is required, the concrete instance used can be specified in a protobuf configuration/content file as a TypeActivationInfo message and will be constructed at run time through reflection. This mechanism can be used for injecting customizable behavior and allows for separating protocols/workflows from business logic details.

The ActivationTypes mechanism provides for an installation to customize the use of the tools provided by the collector. The dynamic nature of the ActivationTypes factory allows for extending the system through customer or third party code. Processing Pipeline The ProcessingPipeline is customizable, for example, in examples that use protobuf configuration files and activation types. The IDL used to define a ProcessingPipeline is viewable at PipelineIDL. ActivationTypes can be used in at least three places in the pipeline definition—Stages, Destinations, and Selector Critieria.

It should be noted that in certain examples, there are six messages used to define a pipeline. These six messages can be organized into three pairs as follows:

DestinationDefinition and DestinationSetDefinition
PipelineStageDefinition and PipelineDefinition
RootPredicate and PipelineItemSelectorDefinition For each of the pairs the first item references an ActivationType? and the second does not. This illustrates the idea mentioned above that ActivationTypes has helped separate the workflows/protocols from the processing details. In each pair the first message defines an object that implements a workflow, and the second defines a configurable instance to provide processing details.

H. Parsing and Formatting

Both parsing and formatting can use ActivationTypes. Parsing content files contain an ActivationType that implements the abstract base class LogParser. Format resolution files contain a ResolverDefinition message which has a set of ResolutionRuleDefinitions each of which is an activation type. Thus, details applied when processing any particular bundle are determined by the content selected for that bundle.

I. Tail Discovery Scripts

Tail discovery scripts can be executed by an agent to learn details about log files used to configure the tail plugin. On Windows it is typical that tail discovery scripts are written in Powershell. For Linux it is typical for scripts to be Bash shell scripts. This is a case where the content is not expressed as protobuf messages. The pattern described above for finding content files in the parsing formatting section applies to tail discovery scripts as well. "Built-in" applications can have their scripts embedded in the CnF? binaries. If a disk resident script file collides with the path of an embedded script the disk resident script has priority.

J. Component Host

ComponentHost is an executable included in certain examples of the disclosed computing platform. ComponentHost serves as a container process to a set of "components" defined as ActivationTypes understood to extend abstract base class HostableComponent.

A. HostableComponent

An example definition of an abstract base class for components hosted by ComponentHost is shown in Table 9.

TABLE 9

```
public abstract class HostableComponent
{
    public abstract void Start (IActiveMQManager activeMQManager,
    ConfigurationSettingParseUtility settingUtility);
    public abstract void Stop( );
    public virtual List<Func<IPerformanceSampleValueProvider>>
    GetPerformanceSampleValueProviders ( )
    {
        return new List<Func<IPerformanceSampleValueProvider>>( );
    }
}
```

Examples of services that can be provided to components by ComponentHost include:
Plumbed to be installed as a Windows service
Manages connection to local ActiveMQ broker
Access to a key value pair Java properties style configuration setting store.
Collects and publishes runtime performance counters
Hosts an HTTP server for providing a RestApi. Components can contribute their own API.

XIV. Example Agent Plugin Configurations

Figure 9:
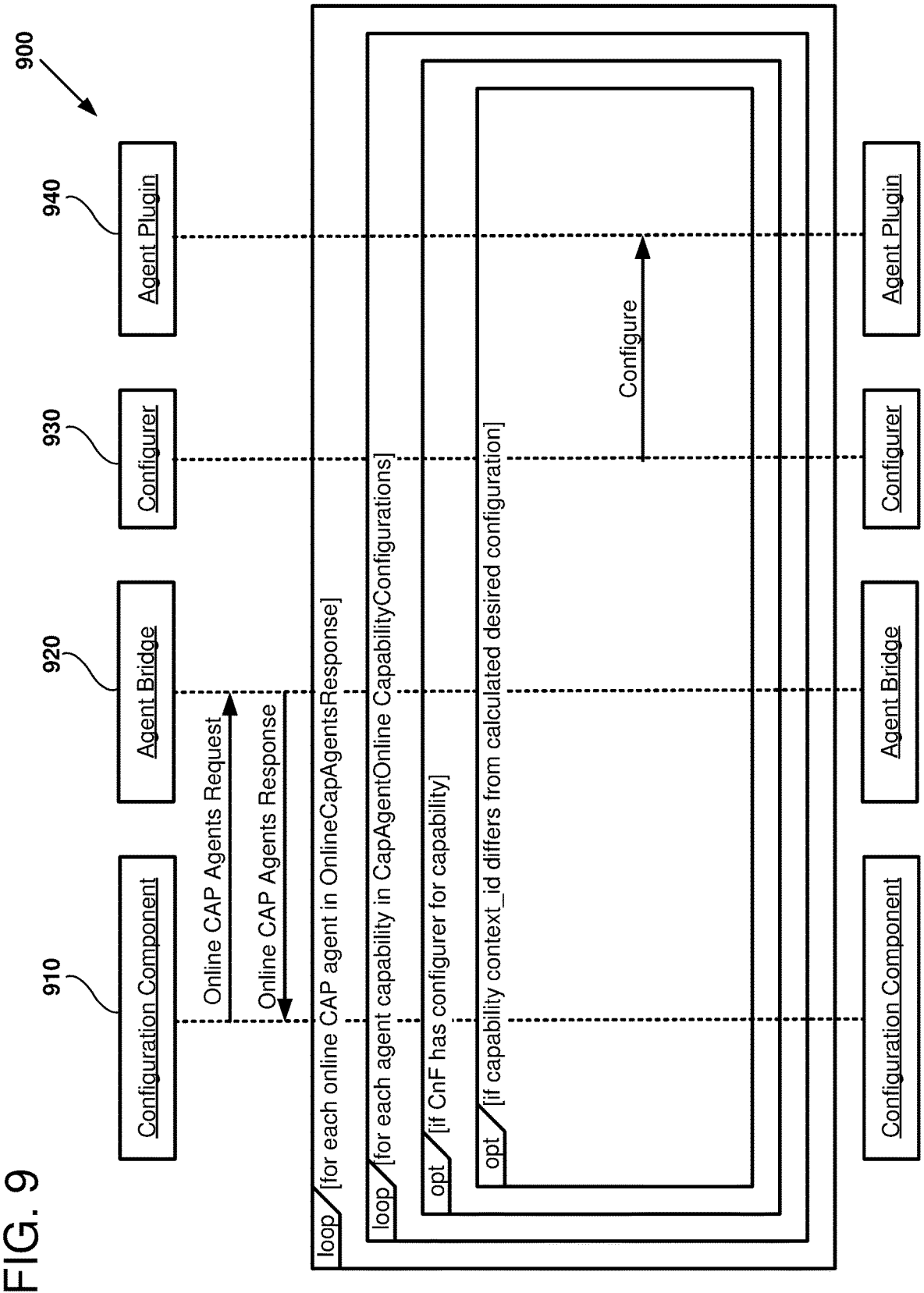
FIG. 9 is a state diagram depicting an example of messages and operations performed during agent plug-in configuration, as can be performed in certain examples of the disclosed technology.

FIG. 9 is a state diagram 900 depicting an example of messages and operations performed during agent plug-in configuration, as can be performed to configure an agent for operation with the disclosed collector pipeline technology. A configuration component 910 can send an online agent request to the agent bridge 920 which sends a response indicating that agents are available for configuration. The configuration component 910 then performs the operations indicated to send messages to a configurer 930 hosted by each of the agents. For example, for each online agent indicated in the online agent response message and for each agent capability indicated as being available in the response agent capability configurations, if the collector has a configurer available for the capability and if the capability context identifier differs from a calculated desired configuration, then the configurer 930 sends a message to an appropriate agent plug-in in order to change the configuration. For example, the plug-in 940 can be configured to change the formatting of data sent by the plug-in, change the manner in which data is collected, provide augmentation data in addition to the collected data, or other operations such that the received data sent by the agent can be processed using a stateless collector framework.

Figure 10:
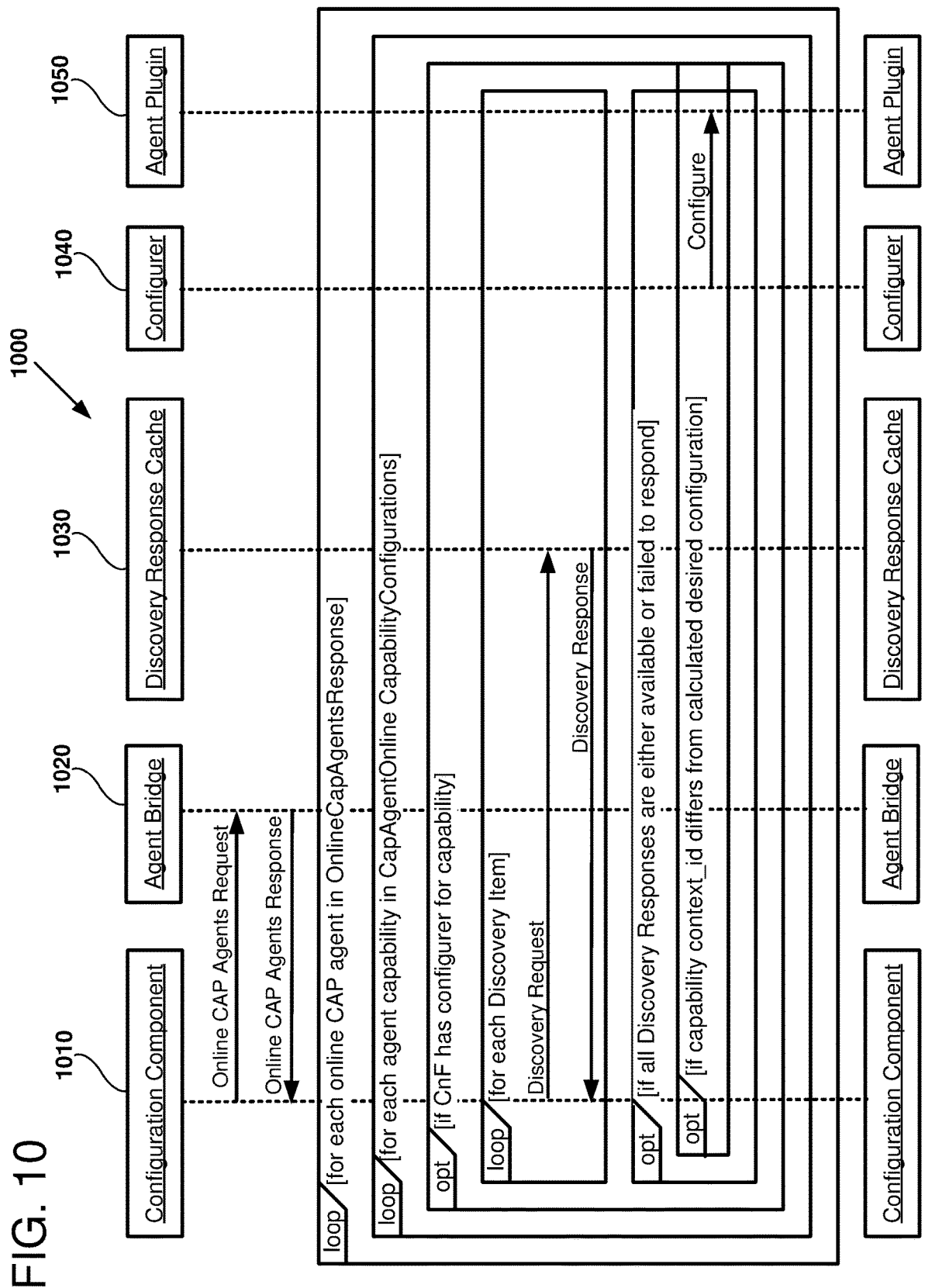
FIG. 10 is a diagram outlining an example of messages transmitted when performing agent plug-in configuration with discovery, as can be implemented in certain examples of the disclosed technology.

FIG. 10 is a diagram 1000 outlining an example of messages transmitted when performing agent plug-in configuration with discovery operations. A configuration component 1010 sends an online agent request to an agent bridge 1020. The agent bridge 1020 sends an online agent response message to the configuration component 1010 indicating information about online agents and each online agents' respective agent capabilities. Then, for each of the online agents indicated in the response message and for each respective agent capability, if the associated collector has a configurer available for the capability, then the collector will perform discovery requests for each discovery item associated with the agent capability. The configuration component can effect this by sending discovery requests to a discovery response cache, which can store discovery response information for use by a configurer 1040 hosted by the respective agent. As each discovery request is received by the discovery response cache 1030, a discovery response message is returned indicating which capabilities and features are available for the respective agent. The configuration component then will send a message to initiate configuration based on the availability or failure to respond for the discovery request and based on the capability context identifiers and whether they differ from a calculated desired agent configuration. Once the discovery response negotiation has completed, the configurer 1040 sends configuration messages to the associated agent plug-ins 1050 to perform the desired configuration.

XV. Example REST Framework

An example ComponentHost process hosts a web server as a service to hosted components to allow them to expose a public Representational State Transfer (REST)-based API. One example of a suitable REST framework is Microsoft's Asp.NET Web API. This technology integrates very easily into the .NET component host process. The Web API also provides a lightweight, self-hosting library for executing a web server in the server process, allowing for easier integration than if an interface between the web server and processing server is to be provided. A hosted component can utilize the example REST framework as follows.

A. IApiContributor Interface

The following optional interface is implemented by a hosted component that wishes to expose a public REST API, as shown in Table 10.

TABLE 10

```
public interface IApiContributor
{
    List<RouteData> Routes { get; }
    IHttpControllerSelector ControllerSelector(HttpConfiguration config);
    string Namespace { get; }
}
```

The Web API is configured to perform a sequence of binding operations to find the correct code to respond to a request. This sequence of binding operations drives the IApiContributor definition.

1. Routes

The first binding operation is to select a route. A route defines a URI pattern and allows assigning names to pieces of the URI pattern that can be accessed as name/value pairs during later binding operations. Routes are the heart of the Web API and a request that cannot be matched to a route is not processed. The "Routes" member of the IApiContributor interface allows a contributor to define its routes.

2 Controller Selection

A controller is a class that implements methods (called "Actions" in Web API terminology) that are used to create responses to web requests. Controller selection means identifying the class that contains the appropriate action for a given request. The ControllerSelector member of IApiContributor requires the contributor to supply a controller selector that can find controllers for its routes.

The example Web API defines a set of conventions for route definition and controller and action naming such that if these conventions are followed, controller selection happens automatically. A contributor can use the default condition by returning an instance of DefaultHttpControllerSelector from their ControllerSelector method, which is the default behavior provided by the Web API library.

3. Namespace Eliminates Colliding Routes

ComponentHost is designed to allow an arbitrary set of components to run successfully side by side. Because components are not required to know about each other, protection is provided from different components supplying routes that will match each other's requests. The IApiContributor Namespace member serves this purpose. During start-up validation is performed to guarantee the following.

Each contributor has a unique Namespace value.
Each Route defined by a contributor uses its namespace as the first value of its URI.
Each route includes a namespace=namespace-value key value pair in its defaults dictionary.

Because each contributor has to put all of its routes under its namespace it is like partitioning all the contributors into a set of distinct folders. The namespace value should make sense to the purpose of the API because customers will use it when typing URLs.

B. Structure of Request/Responses

A number of patterns can be adopted for the disclosed framework routes for use in some examples of collector implementations. The example Web API includes a modeling feature that allows expressing the signatures of action methods with complex types defined as C# classes.

While the example REST platform is explained using a messaging API express in protobuf, it will be readily understood to one of ordinary skill in the relevant art that a large variety of languages can be employed and offering convenient JSON serialization. In the example REST framework, complex requests are handled as POST messages with a body consisting of a JSON serialization of the appropriate protobuf defined request message. Responses have a body consisting of the JSON serialization of the appropriate protobuf defined response message.

Thus, the example REST framework API includes its defined URIs along with a set of protobuf defined request/response messages for complex types. Complex types are passed as JSON serializations of the appropriate protobuf messages in the bodies of HTTP requests and responses.

C. Example Security Model

This section includes a description of a security model for examples of the disclosed REST framework. In some examples, configuration of REST Security is protected by an application-managed password. A portion of the security model managed through integration with an LDAP store. The security password is stored encrypted on the local disk using a secure symmetric encryption algorithm. The encryption key is deterministically constructed programmatically in the code. Constructing the key at runtime means that the key cannot be discovered just by examining the contents of the binary file. There is still some possibility that an attacker could gain the encryption key either by examining memory at run-time, or reverse engineering the encryption key generation code.

4. Security Through Cookie-Based Sessions

The example REST framework provides session management. Sessions are created after successful execution of a login REST API request. The response to a login request adds a session cookie as well as having a body consisting of a login response. The example REST framework also serves a login html page that makes Ajax login requests.

Login credentials are validated against the LDAP store whose configuration is described above. Each collector-defined role can be mapped by the customer to a group defined in their LDAP store. Performing this mapping will occur in the LDAP configuration UI described above.

5. Authorization

In Web API authorization requirements are expressed as attributes on actions or controllers. The Web API allows defining custom authorization attributes by extending the AuthorizationFilterAttribute class.

6. HasValidSessionAuthorizationFilterAttribute

Applying the HasValidSessionAuthorizationFilterAttribute to an action or controller will inject a check for a valid session prior to executing the action. Failure to find a valid session will cause either a 302 or 401 response to be generated. Which response is generated depends on the value of the redirectToLogin parameter passed to the constructor of the attribute. Redirection is used for UI page requests, while it is expected that programmatic clients will handle the 401.

public HasValidSessionAuthorizationFilterAttribute(bool redirectToLogin)

7 HasRoleAuthorizationFilterAttribute

Applying the HasRoleAuthorizationFilterAttribute to an action or controller will inject a check for the current role authorization filter attribute.

XVI. Activation Types

One of the desirable design goals of the disclosed computing platform is flexibility in system operation through configuration. A pattern that has proved useful is called "activation types." Activation types can be defined in Google protobuf. These messages include the information necessary to construct runtime .Net objects via reflection. Defining processing engines this way has the following benefits:

Simplifies describing complex structures via configuration by utilizing Protobuf JSON serialization.

Enables pushing more functionality to the disclosed computing platform which does not need to understand the types that will be used at runtime.

Allows for third party contribution of processing machinery.

Allows for out of release cycle bug fixes through creation of small assemblies with fixed classes replacing ones with bugs, loaded via configuration D. Constructor Parameters Constructor parameters are defined as string. The implementer of an activation type will handle type coercion of constructor arguments rather than complicate the model with a concept of type.

Constructor parameters are expected to include those items that would vary based on user configuration. Any additional values/references needed by the API can be set after construction.

E. Usage

Activation types are used in a context where the reflection created objects are understood to implement a known interface or abstract base class. If it is desired to set any properties outside of the configuration values understood by the user, then these properties are defined on the interface/abstract base class so they can be set independent of the constructor. This is to avoid putting hard to know about requirements on implementers.

F. Security

The current implementation does not place any restrictions on the origin of objects instantiated as an activation type. .Net supports restrictions both based on the location of the loaded assembly and also the signer of the assembly.

G. IDL

An example Interface Description Language (IDL) for implemented an Activation Type is shown below in Table 11.

TABLE 11

```
message CollectionParameter {
  repeated string items = 1;
}
//Info necessary to dynamically instantiate types.
message TypeActivationInfo {
  required string fullyQualifiedTypeName = 1;
  required string assemblyName = 2;
  repeated string constructorparameters = 3;
  repeated Collectionparameter constructorCollectionParameters = 4;
}
//Represents a set of types to activate
message ActivationTypes {
  repeated TypeActivationInfo typesToActivate = 1;
}
```

XVII. Content Predicates

The Content Predicate feature allows defining arbitrarily complex predicates (bool valued functions) over a type T as content. Content generally means JSON serialized protobuf messages, and this is true for content predicates as well.

A. Example Protobuf Message Structure

An example Interface Definition Language (IDL) interface that defines content predicates is included below in Table 12:

TABLE 12

```
message RootPredicate {
  optional NotPredicateDefintion notPredicate = 1;
  optional AndPredicateDefintion andPredicate = 2;
  optional OrPredicateDefintion orPredicate = 3;
  optional collector.ActivationInfo.TypeActivationInfo leafPredicate = 4;
}
message NotPredicateDefintion {
  optional NotPredicateDefintion notPredicate = 1;
  optional OrPredicateDefintion orPredicate = 2;
  optional AndPredicateDefintion andPredicate = 3;
  optional collector.ActivationInfo.TypeActivationInfo leafPredicate = 4;
}
message OrPredicateDefintion {
  optional NotPredicateDefintion leftNotPredicate = 1;
  optional OrPredicateDefintion leftOrPredicate = 2;
  optional AndPredicateDefintion leftAndPredicate = 3;
  optional collector.Activationinfo.TypeActivationInfo leftLeafPredicate = 4;
  optional NotPredicateDefintion rightNotPredicate = 5;
  optional OrPredicateDefintion rightOrPredicate = 6;
```

TABLE 12-continued

```
    optional AndPredicateDefintion rightAndPredicate = 7;
    optional collector.Activationinfo.TypeActivationInfo rightLeafPredi-
cate =
8;
}
message AndPredicateDefintion {
    optional NotPredicateDefintion leftNotPredicate = 1;
    optional OrPredicateDefintion leftOrPredicate = 2;
    optional AndPredicateDefintion leftAndPredicate = 3;
    optional collector.Activationinfo.TypeActivationInfo leftLeafPredicate
=
4;
    optional NotPredicateDefintion rightNotPredicate = 5;
    optional OrPredicateDefintion rightOrPredicate = 6;
    optional AndPredicateDefintion rightAndPredicate = 7;
    optional collector.ActivationInfo.TypeActivationInfo rightLeafPredi-
cate =
8;
}
```

The non-root predicate messages here can be recursively defined, allowing for construction of arbitrarily complex structure. The structure of these messages mirrors the parse tree that would be created if a logical expression parser were created and the predicates were expressed as standard textual logical expressions. Requiring predicates to be pre-parsed saves the work of creating a parser.

B. Leaf Predicates

The leaf predicate properties are not recursively defined but instead are ActivationTypes. Content predicates are defined over a type T. At runtime when a content predicate is instantiated it is expected that the leaf predicates extend the abstract base class shown in Table 13:

TABLE 13

```
public abstract class Predicate<T>
{
    public abstract bool Eval(T item);
}
```

If this is not the case, a runtime error ensues.

C. Example Selector Criteria Extensions

Several concrete Predicate<LogMessages> extensions have been defined in CnF for use as selector criteria, as described below.

1. LogMessageHostnameRegexSelectionCriterion constructor
public LogMessageHostnameRegexSelectionCriterion
    (string hostnameRegexPattern)
LogMessageHostnameRegexSelectionCriterion evaluates to true if the hostname of the source of the logs is matched by the supplied regex.

2 LogMessageCidrBlockIPSelectionCriterion constructor
public LogMessageCidrBlockIPSelectionCriterion(string block)
LogMessageCidrBlockIPSelectionCriterion evaluates to true if the IP address of the source of the logs is included in the CIDR block supplied as constructor argument.

3. LogMessageSourceSelectionCriterion constructors
public LogMessageSourceSelectionCriterion(string primaryQualifier)
public LogMessageSourceSelectionCriterion(string primaryQualifier, List<string> secondaryQualifers)
public LogMessageSourceSelectionCriterion(string caseSensitive, string primaryQualifier)
public LogMessageSourceSelectionCriterion(string caseSensitive, string primaryQualifier, List<string> secondaryQualifers)

LogMessageSourceSelectionCriterion evaluates to true if the LogMessageSource of the LogMessages instances matches the qualifiers supplied as arguments. Qualifier evaluation is performed up to the number of qualifiers supplied in the constructor arguments. A bundle whose LogMessageSource contains more qualifiers than the criteria is matched if its prefix matches the criteria. Qualifier comparison is case sensitive by default but this can be changed by setting caseSensitive to "false" in the constructor.

4. BusinessContextSelectionCriterion

The BusinessContextSelectionCriterion selector enables control flow within the pipeline based on the presence of asset tags.

D. Example Serialization

To illustrate below in Table 14 is an example protobuf JSON serialization of a pipeline selector that selects bundles from IIS but not from IPs in CIDR block 10.248.101.0/24 unless it is from foo.com. Microsoft IIS (Internet Information Services) is an example of a suitable web server that can be used in certain examples of the disclosed technology. Because selectors exist in the context of a pipeline definition, the JSON below would be not be isolated as it is in this page, but instead be part of a larger pipeline definition message.

TABLE 14

```
{
    "criteria": {
        "andPredicate": {
            "leftLeafPredicate"
                "fullyQualifiedTypeName":
"CnF.Collection.Selectors.LogMessageSourceSelectionCriterion",
                "assemblyName" : "CnF.Collection",
                "constructorparameters": [
                    "false",
                    "cap"
                ],
                "constructorCollectionParameters": [
                    {
                        "items": [
                            "cnftail",
                            "iis"
                        ]
                    }
                ]
            },
            "rightOrPredicate" : {
                "leftNotPredicate": {
                    "leafPredicate": {
                        "fullyQualifiedTypeName":
"CnF.Collection.Selectors.LogMessageCidrBlockIPSelectionCriterion",
                        "assemblyName": "Cnf.Collection",
                        "constructorparameters": [
                            "10.248.101.0\ /24"
                        ]
                    }
                },
                "rightLeafPredicate": {
                    "fullyQualifiedTypeName":
"CnF.Collection.Selectors.LogMessageHostnameRegexSelection
Criterion",
                    "assemblyName": "CnF.Collection",
                    "constructorparameters": [
                        "foo.com"
                    ]
                }
            }
        }
    }
}
```

E. Human Readability Vs. Integrity Trade-Off

The message structure described here reflects the poor support protobuf has for polymorphism. A human readability versus integrity tradeoff is apparent in this message structure. Taking the OrPredicateDefinition for example, exactly one of the "left" and one of the "right" properties must be populated for this predicate to be sensible. Protobuf has no way of enforcing this integrity condition. As a result it is a runtime requirement for the factory that instantiates content predicates to validate this and opens the door to runtime errors if the validation fails.

An alternative definition that does not allow for invalid messages to be defined is shown below in Table 15. Here every property is required and the construction of insensible messages is not possible. One issue with this treatment is the use of the bytes type. Using this structure would make the messages opaque to human readability.

TABLE 15

```
enum PredicateType {
   NotPredicate = 1;
   OrPredicate = 2;
   AndPredicate = 3;
   LeafPredicate = 4;
}
message OrPredicateDefintion {
   required bytes leftPredicate = 1;
   required PredicateType leftType = 2;
   required bytes rightPredicate = 3;
   required PredicateType rightType = 4;
```

XVIII. Example Computing Environment

Figure 11:
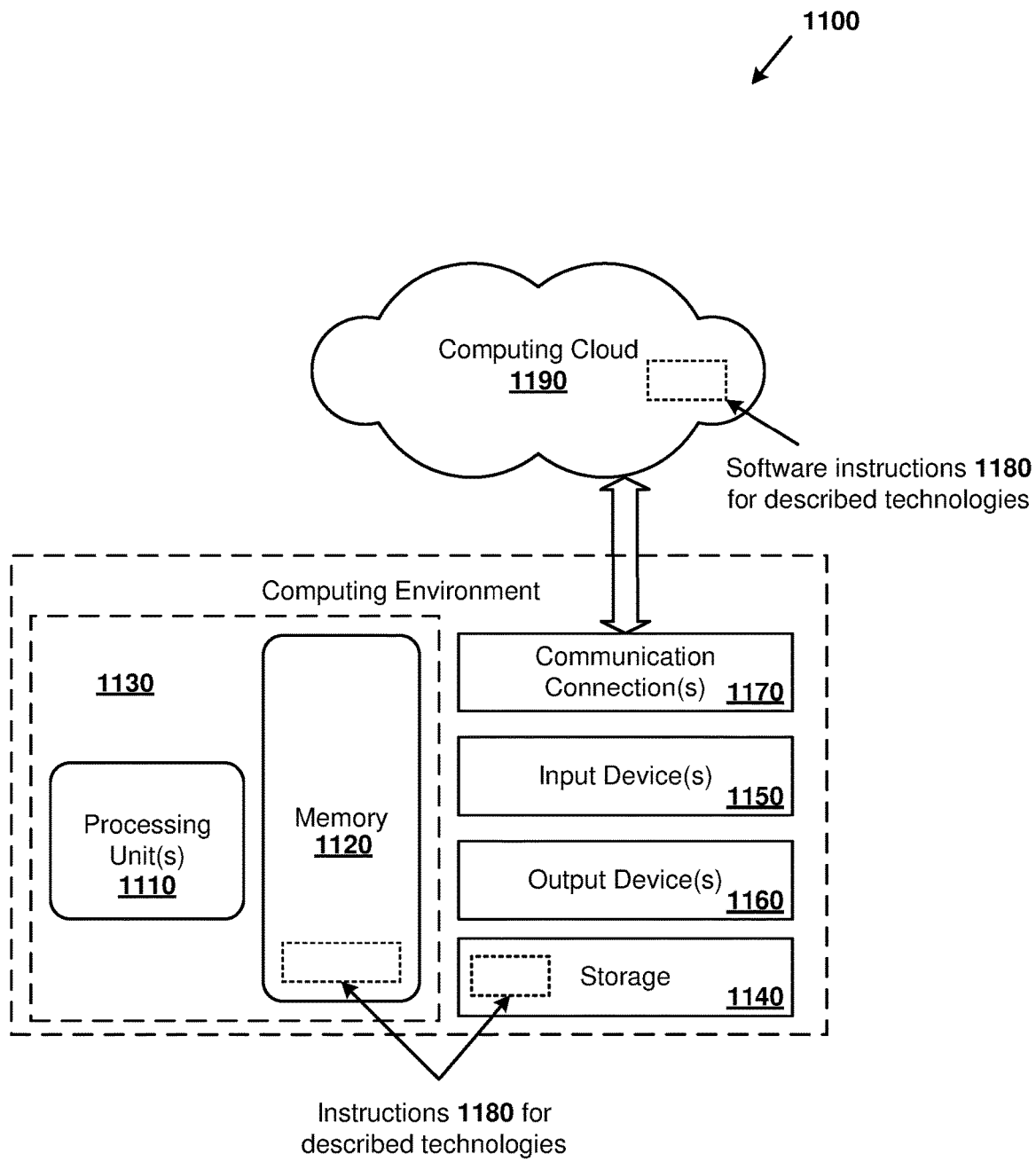
FIG. 11 illustrates an example of a suitable computing environment in which certain embodiments, techniques, and technologies can be implemented.

FIG. 11 illustrates a generalized example of a suitable computing environment 1100 in which described embodiments, techniques, and technologies, including reporting agents and monitor servers, can be implemented. For example, the computing environment 1100 can implement any of the agents, collector agent platform servers, and destination agent data consumers, as described herein.

The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180, images, and video that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and that can be accessed within the computing environment 1100. The storage 1140 stores instructions for the software 1180, plugin data, and messages, which can be used to implement technologies described herein.

The input device(s) 1150 may be a touch input device, such as a keyboard, keypad, mouse, touch screen display, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, video, or other data in a modulated data signal. The communication connection(s) 1170 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and destination agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1190. For example, agents can be executing vulnerability scanning functions in the computing environment while agent platform (e.g., bridge) and destination agent data consumer service can be performed on servers located in the computing cloud 1190.

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes the media for data storage such as memory 1120 and storage 1140, and not transmission media such as modulated data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

We claim:

1. A system, comprising:
   a plurality of computing hosts, each computing host comprising a processor and memory, each computing host executing an agent accessible via a computer network, each agent being configured to gather data describing operational aspects of the respective agent's computing host and to augment the gathered data with augmentation information designating a plurality of destinations; and
   a collector server comprising circuitry programmed to:
   receive reports from the agents, the reports having a body comprising the gathered data;
   select a plurality of destination agent data consumers based at least in part on the augmentation information in the reports; and
   send the gathered data to the selected destination agent data consumers designated by the augmentation information in the reports,
   wherein the collector server is separate and distinct from the plurality of agents, and wherein the collector server sends messages to both discover and configure the plurality of agents, and
   wherein the collector server enhances data in the body of the received reports into a format selected based on the destination agent data consumer.

2. The system of claim 1, wherein each of the agents is configured using a discovery script to configure the agent based on available resources and plugins executed by the agent.

3. The system of claim 1, wherein the collector server includes a processing pipeline configured to select a scaled or non-scaled destination set.

4. The system of claim 1, wherein the collector server includes a processing pipeline configured to transform data received from the agents using one or more stage selector rules.

5. The system of claim 1, wherein the plurality of destination agent data consumers comprises at least one of the following: map-reduce computing cluster or a resilient distributed dataset cluster.

6. The system of claim 1, wherein the collector server is configured using a programmable template.

7. The system of claim 1, wherein the collector server includes a processing pipeline configured to transform data received from one or more of the agents using one or more stage selector rules, at least one of the stage selector rules being based on a tag associated with the one or more of the agents.

8. The system of claim 1, wherein the augmentation information comprises at least one of the following: an IP address of a destination, a service name of a destination, data formatting rules for a destination, and contextual details about the computing host.

9. A method of transmitting data with a pipeline process, the method comprising:
   receiving, by a collector server, a report from a data collecting agent, the received report including data and augmentation information designating one or more destinations, the data being gathered by the data collecting agent and describing operational aspects of a computing host that executes the data collecting agent accessible via a computer network, the data collecting agent being configured to gather data describing operational aspects of the data collecting agent's computing host and to augment the gathered data with augmentation information designating a plurality of destinations;
   enhancing, by the collector server, the received data in the received report into a format selected based on the designated one or more destinations by applying one or more stage selector rules to the received data, the enhanced data including a subset of the received data defined based at least in part on the stage selector rules, the applying one or more stage selector rules including selecting one or more destination agent data consumers from a plurality of destination agent data consumers based at least in part on the augmentation information in the received report; and
   sending, by the collector server, the enhanced data to the selected one or more destination agent data consumers, wherein the sending the enhanced data comprises, based on an applied one of the stage selector rules:
   if a destination agent data consumer is selected by the applied stage selector rule, then sending the enhanced data to the destination agent data consumer indicated by the stage selector rule; and
   if no destination agent consumer is selected by the applied stage selector rule, then sending the enhanced data to a destination indicated by an affinity service, the affinity service selecting the destination from among multiple possible destinations based on network traffic conditions or random selection.

10. The method of claim 9, wherein the enhancing comprises filtering the received data.

11. The method of claim 9, wherein the enhancing comprises modifying the received data to a format selected based on the destination agent data consumer.

12. The method of claim 9, wherein the destination agent data consumers are selected based at least in part on feedback from a load balancer.

13. The method of claim 9, wherein the stage selector rules are arranged according to a JavaScript Object Notation (JSON) format.

14. The method of claim 9, wherein the data is enhanced based on tag information in the received data.

15. The method of claim 9, wherein the sending the enhanced data comprises sending the enhanced data to each destination agent data consumer in a destination set indicated by an applied one of the stage selector rules.

16. The method of claim 9, wherein the one or more stage selector rules are for a first stage, the method further comprising, prior to the sending the enhanced data, further enhancing the received data by applying an additional one or more stage selector rules to the received data.

17. The method of claim 9, wherein the stage selector rules are user-generated.

18. A method of generating and using augmentation data with an agent executing on a computing host, the method comprising:
   configuring data gathering behavior of the agent based on a configuration template received from a collector via a computer network coupled to the computing host, the agent being configured to gather data describing operational aspects of the agent's computing host and to augment the gathered data with augmentation information designating a plurality of destinations;
   generating destination information based on the configuration template, the destination information identifying multiple destinations, each of the multiple destinations being distinct from the collector;

with the agent, gathering data about the computing host according to the configured data gathering behavior defined by the configuration template;

receiving, by the collector, a report from the agent, the report having a body comprising the gathered data;

enhancing, by the collector, the gathered data into a format selected based on the identified destinations; and sending a message to the collector, the message including the gathered data and the destination information.

19. The method of claim 18, further comprising:

by the collector, sending the message to each of the identified destinations indicated by the destination information.

20. The method of claim 18, wherein the configuration template includes a description of data to be collected by the agent.

21. The method of claim 18, wherein the configuring comprises:

executing a discovery script with the agent to determine plugins of the agent for which to gather data; and performing the configuring data gathering behavior of the agent based on the determined plugins.

* * * * *